United States Patent
Sekiya et al.

(10) Patent No.: US 6,839,162 B2
(45) Date of Patent: Jan. 4, 2005

(54) OPTICAL AMPLIFYING APPARATUS AND OPTICAL COMMUNICATION SYSTEM

(75) Inventors: Motoyoshi Sekiya, Kawasaki (JP); Hiroaki Tomofuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/948,858

(22) Filed: Sep. 10, 2001

(65) Prior Publication Data

US 2002/0024723 A1 Feb. 28, 2002

Related U.S. Application Data

(63) Continuation of application No. PCT/JP00/07513, filed on Oct. 26, 2000.

(30) Foreign Application Priority Data

Feb. 28, 2000 (JP) ........................................ 2000-051050

(51) Int. Cl.$^7$ ................................................. H01S 3/00
(52) U.S. Cl. .................................................... 359/337.4
(58) Field of Search ........................ 359/337.1, 337.12, 359/337.13, 337.4, 337.41, 341.42

(56) References Cited

U.S. PATENT DOCUMENTS

| | | | | |
|---|---|---|---|---|
| 5,721,635 A | | 2/1998 | Shigematsu et al. | ......... 359/341 |
| 5,847,862 A | | 12/1998 | Chraplyvy et al. | ......... 359/337 |
| 5,872,650 A | | 2/1999 | Lee et al. | ......... 359/34.1 |
| 5,912,760 A | * | 6/1999 | Sugiya | ......... 359/341 |
| 5,978,130 A | * | 11/1999 | Fee et al. | ......... 359/341 |
| 6,049,413 A | * | 4/2000 | Taylor et al. | ......... 359/337 |
| 6,049,417 A | * | 4/2000 | Srivastava et al. | ......... 359/341 |
| 6,049,418 A | * | 4/2000 | Srivastava et al. | ......... 359/337.4 |
| 6,151,158 A | * | 11/2000 | Takeda et al. | ......... 359/341 |
| 6,157,481 A | * | 12/2000 | Sugaya et al. | ......... 359/337 |
| 6,201,636 B1 | * | 3/2001 | Noda | ......... 359/337 |
| 6,288,836 B1 | * | 9/2001 | Kawasaki et al. | ..... 359/341.42 |
| 6,307,668 B1 | * | 10/2001 | Bastien et al. | ......... 359/337.1 |
| 6,310,716 B1 | * | 10/2001 | Evans et al. | ......... 359/334 |
| 6,411,429 B1 | * | 6/2002 | Tomofuji et al. | ......... 359/337 |
| 6,452,722 B1 | * | 9/2002 | Krummrich et al. | ... 359/341.41 |
| 6,510,000 B1 | * | 1/2003 | Onaka et al. | ......... 359/334 |
| 6,512,628 B1 | * | 1/2003 | Terahara et al. | ......... 359/334 |

FOREIGN PATENT DOCUMENTS

| | | | |
|---|---|---|---|
| EP | 0 714 187 | 5/1996 | ............ H04J/14/00 |
| EP | 0 944 188 | 9/1999 | ............ H04B/10/17 |
| EP | 0 959 577 | 11/1999 | ............ H04J/14/02 |
| EP | 1107486 A2 | 6/2001 | ............ H04B/10/17 |
| JP | 8-204647 | 8/1996 | ............ H04B/10/17 |
| JP | 9-6326519 | 12/1997 | ............ H01S/3/10 |
| JP | 11-46029 | 2/1999 | ............ H01S/3/10 |
| JP | 11-252048 | 9/1999 | ............ H05J/14/00 |
| JP | 11-275021 | 10/1999 | ............ H04B/10/14 |

OTHER PUBLICATIONS

Weik, Mart, Fiber Optics Standard Dictionary, 1999, Chapman & Hall, 3$^{rd}$ Ed, p. 1053.*

(List continued on next page.)

*Primary Examiner*—Thomas G. Black
*Assistant Examiner*—Deandra M. Hughes
(74) *Attorney, Agent, or Firm*—Staas & Halsey LLP

(57) ABSTRACT

The present invention relates to an optical amplifying apparatus and a complex optical amplifying apparatus which compensate a loss as a function of wavelength of an optical transmission line by a gain as a function of wavelength, and further relates to an optical communication system which includes apparatuses such as an optical transmitting apparatus, an optical repeating apparatus, and an optical receiving apparatus. The above apparatuses and the optical communication system make it possible to broaden a wavelength band and lengthen a transmission distance.

21 Claims, 15 Drawing Sheets

OTHER PUBLICATIONS

Ghafouri–Shiraz, H., Fundamentals of Laser Diode Amplifiers, 1996, John Wiley & Sons, p. 9.*

Becker et al., Erbium–Doped Fiber Amplifiers Fundamentals and Technology, Academic Press, 1999, pp. 238–239.*

Agrawal, Govind P. Fiber–Optic Communication Systems, John Wiley & Sons, Inc. 1997. 2nd Edition. pp. 55–62, 361–367, 391 399.*

Nilsson J. et al., "Alternating Cascade of Spectrally Different Erbium–Doped Fiber Amplifiers For Link–Loss–Insensitive Long–Haul WDM Transmission"; Journal of Lightwave Technology, IEEE. New York, US, vol. 17, No. 3, Mar. 1999, pp. 434–444, XP000801718; ISSN: 0733–8724.

Sugaya Y. et al., "Novel Configuration For Low–Noise and Wide–Dynamic–Range Er–Doped Fiber Amplifier For WDM Systems", OAA Paper '95 FC3, XX, XX, Jun. 16, 1999, XP002918851.

Patent Abstract of Australian Patent 39024/95 dated May 30, 1996.

* cited by examiner

FIG.2
A.
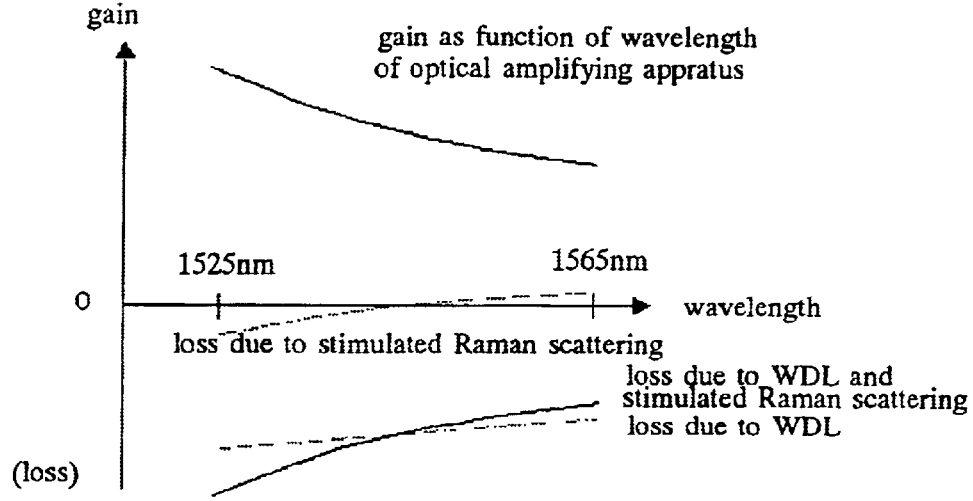
B.
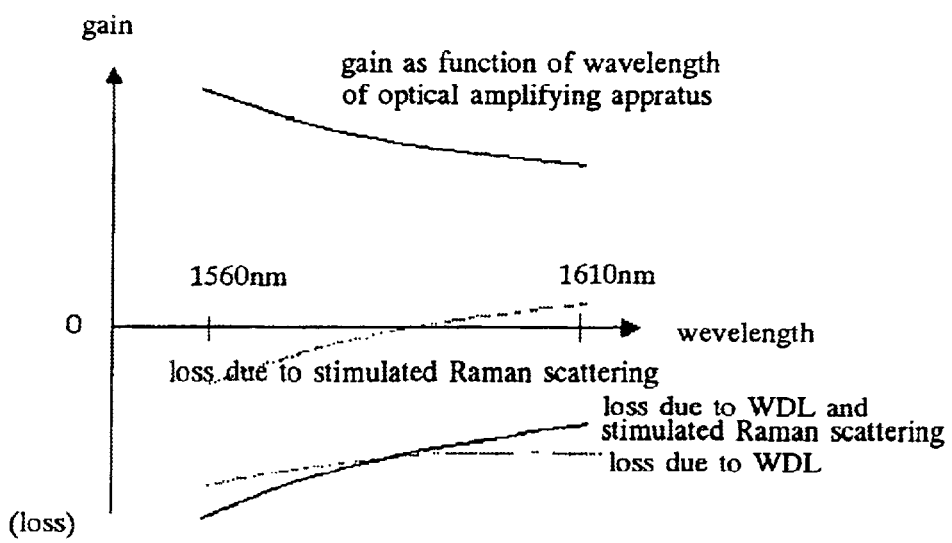

amplification wavelength band of optical amplifying part
(wavelength band of WDM optical signal)

FIG.7
A.
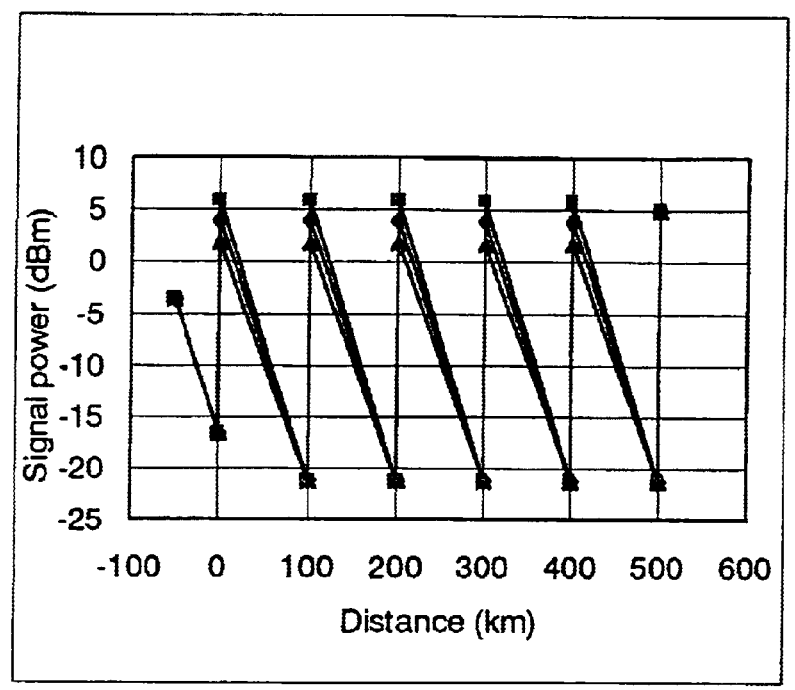
B.
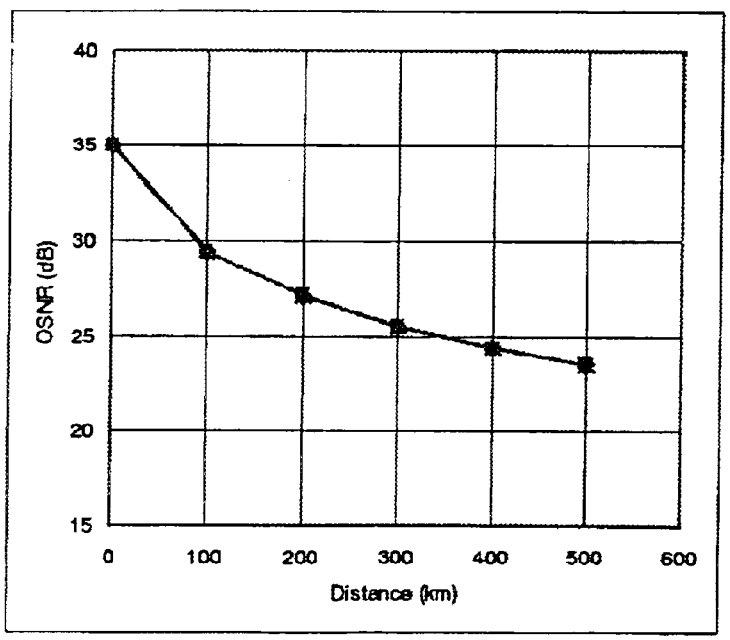

FIG.8
A
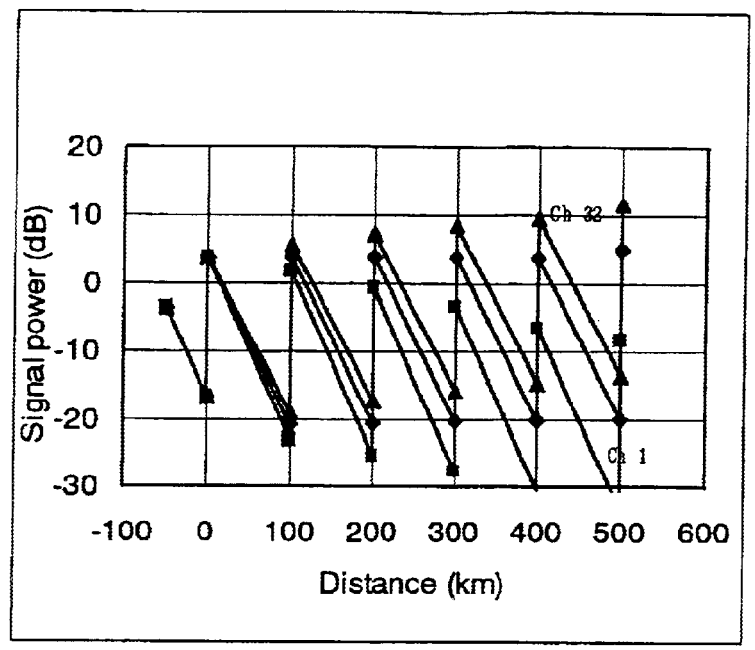
B.
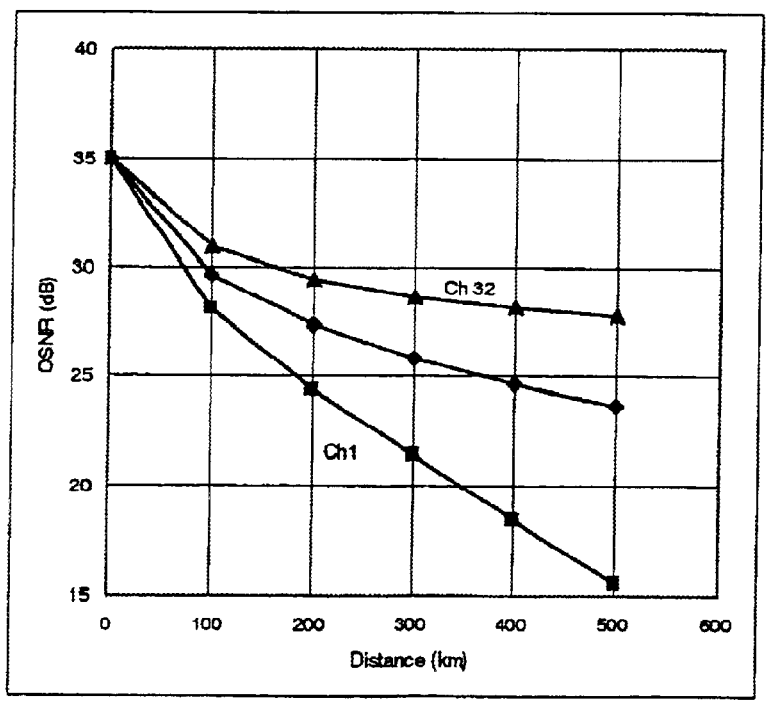

FIG.11
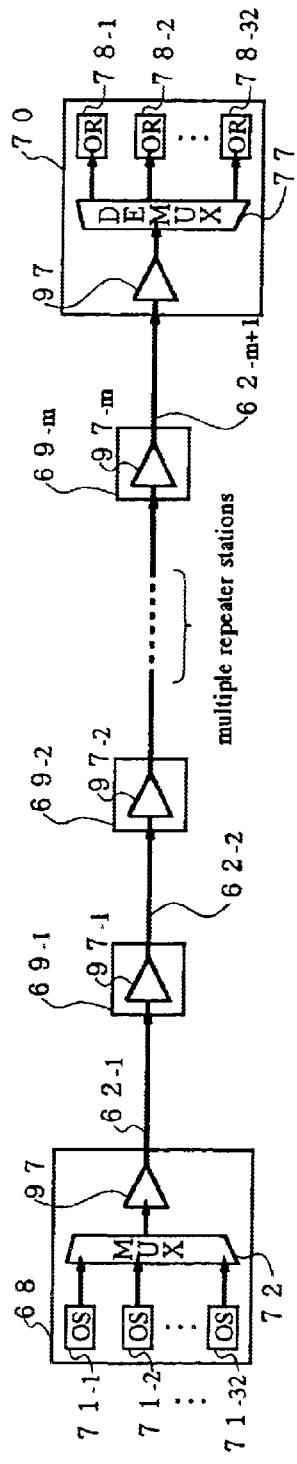
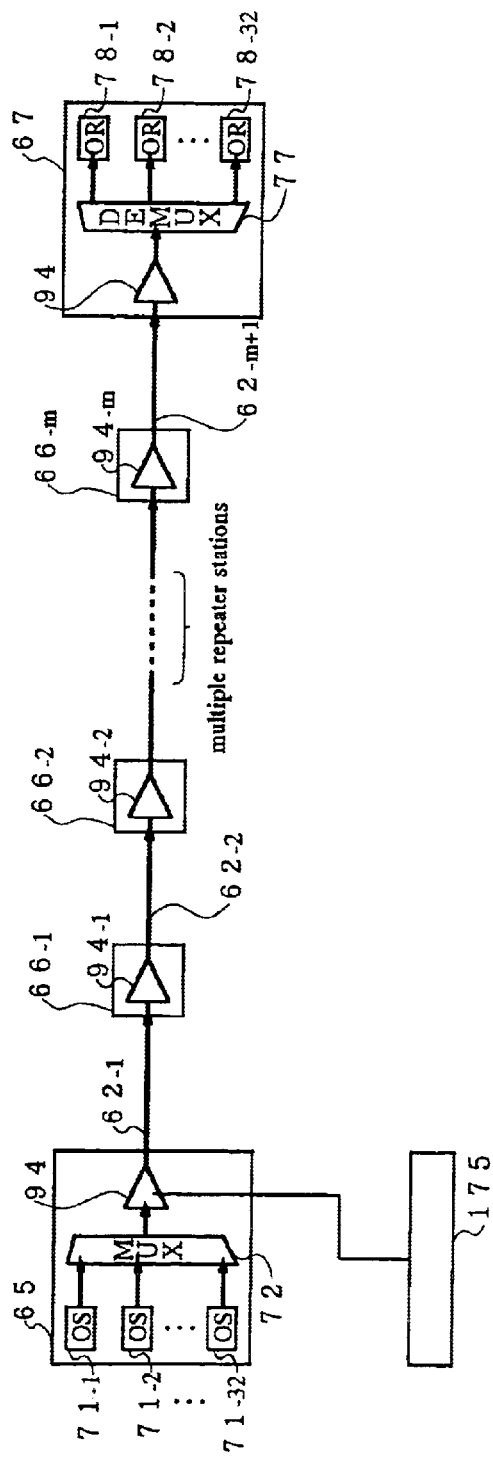

| length (km)<br>multiplex number | 0~25 | 25~50 | 50~75 | 75~100 | 100~125 |
|---|---|---|---|---|---|
| 1~8 | 0 | 0.2 | 0.3 | 0.5 | 0.6 |
| 9~16 | 0 | 0.3 | 0.4 | 0.6 | 0.7 |
| 17~24 | 0 | 0.4 | 0.5 | 0.7 | 0.8 |
| 25~32 | 0 | 0.5 | 0.6 | 0.8 | 0.9 |

B.

| length (km) multiplex number | | 0~25 | | 25~50 | | 50~75 | | 75~100 | | 100~125 | |
|---|---|---|---|---|---|---|---|---|---|---|---|
| C band | L band | C | L | C | L | C | L | C | L | C | L |
| 1~8 | 1~8 | 0 | 0 | 0.2 | 0.2 | 0.3 | 0.3 | 0.5 | 0.5 | 0.6 | 0.6 |
| | 9~16 | 0 | 0.1 | 0.2 | 0.3 | 0.3 | 0.4 | 0.5 | 0.6 | 0.6 | 0.7 |
| | 17~24 | 0 | 0.2 | 0.3 | 0.4 | 0.4 | 0.5 | 0.6 | 0.7 | 0.7 | 0.8 |
| | 25~32 | 0 | 0.3 | 0.3 | 0.5 | 0.4 | 0.6 | 0.6 | 0.8 | 0.7 | 0.9 |
| 9~16 | 1~8 | 0.2 | 0.1 | 0.3 | 0.2 | 0.4 | 0.3 | 0.6 | 0.5 | 0.7 | 0.6 |
| | 9~16 | 0.2 | 0.2 | 0.3 | 0.3 | 0.5 | 0.4 | 0.6 | 0.6 | 0.7 | 0.7 |
| | 17~24 | 0.2 | 0.3 | 0.4 | 0.4 | 0.6 | 0.5 | 0.7 | 0.7 | 0.8 | 0.8 |
| | 25~32 | 0.2 | 0.4 | 0.4 | 0.5 | 0.7 | 0.6 | 0.7 | 0.8 | 0.8 | 0.9 |
| 17~24 | 1~8 | 0.3 | 0.2 | 0.4 | 0.3 | 0.5 | 0.4 | 0.7 | 0.6 | 0.8 | 0.7 |
| | 9~16 | 0.3 | 0.3 | 0.4 | 0.4 | 0.6 | 0.5 | 0.7 | 0.7 | 0.8 | 0.8 |
| | 17~24 | 0.3 | 0.4 | 0.5 | 0.5 | 0.7 | 0.6 | 0.8 | 0.8 | 0.9 | 0.9 |
| | 25~32 | 0.3 | 0.5 | 0.5 | 0.6 | 0.8 | 0.7 | 0.8 | 0.9 | 0.9 | 1 |
| 25~32 | 1~8 | 0.4 | 0.2 | 0.5 | 0.3 | 0.6 | 0.4 | 0.8 | 0.6 | 0.9 | 0.7 |
| | 9~16 | 0.4 | 0.3 | 0.5 | 0.4 | 0.7 | 0.5 | 0.8 | 0.7 | 0.9 | 0.8 |
| | 17~24 | 0.4 | 0.4 | 0.6 | 0.5 | 0.8 | 0.6 | 0.9 | 0.8 | 1 | 0.9 |
| | 25~32 | 0.4 | 0.5 | 0.6 | 0.6 | 0.9 | 0.7 | 0.9 | 0.9 | 1 | 1 |

OPTICAL AMPLIFYING APPARATUS AND OPTICAL COMMUNICATION SYSTEM

CROSS REFERENCE TO RELATED APPLICATION

This application is a continuation application of International Application PCT/JP00/07513, filed Oct. 26, 2000, and designating the U.S.

BACKGROUND OF THE INVENTION

1. Field of the Invention

The invention relates to an optical amplifying apparatus which is used for a repeater station and an optical add/drop multiplexer in an optical communication system, and more particularly, to an optical amplifying apparatus and a complex optical amplifying apparatus which improve an optical signal to noise ratio by compensating loss as a function of wavelength of an optical transmission line. Further, the invention relates to an optical communication system comprising the apparatuses.

2. Description of the Related Art

Optical communication apparatuses with ultra-long distance and large capacity have been required with the objective of constructing a future multimedia network. Research and development on wavelength-division multiplexing (hereinafter abbreviated to "WDM") is carried on in order to realize the large capacity, because it has the advantages of efficiently utilizing the properties of broadband/large-capacity of an optical fiber and the like.

An optical communication system which employs a WDM optical signal includes an optical transmitting station which generates the WDM optical signal with a plurality of optical signals whose wavelengths are different from each other being multiplexed therein and sends it out, an optical transmission line which transmits the WDM optical signal being sent out, and an optical receiving station which receives the transmitted WDM optical signal. Further, one or a plurality of repeater station having an optical amplifier is provided at some midpoint in the optical transmission line, in order to lengthen a transmission distance.

In the optical communication system, the transmission distance is limited by a gain balance based on a gain as a function of wavelength of the optical amplifier in the repeater station. The reason is that, when the repeater stations are cascaded in order to lengthen the transmission distance, gain inclinations which occur in the optical amplifiers in the respective repeater stations accumulate to degrade an optical signal to noise ratio (hereinafter abbreviated to "optical SNR") in a channel with low signal power in the WDM optical signal, and to degrade a waveform in a channel with high signal power in the WDM optical signal due to a nonlinear optical effect or the like.

Therefore, in the conventional art, the optical amplifier is controlled so that fixed gains are provided in the all channels of the WDM optical signal, and the WDM optical signal is transmitted so that differences of signal powers between the respective channels are minimized.

Meanwhile, it is the recent tendency that the WDM optical signal increases its multiplicity and a wavelength band is broadened, in order to deal with an increase of a communication quantity.

There is loss as a function of wavelength in the optical transmission line such as an optical fiber, and when the wavelength band is broadened, a loss difference between a channel in a short wavelength side and a channel in a long wavelength side in the WDM optical signal becomes larger as compared with the conventional art.

For example, as to the loss as a function of wavelength of the optical fiber in 1550 nm band, it is known that a loss coefficient is about −0.0005 dB/nm/km. Accordingly, when a wavelength bandwidth of the WDM optical signal is 25 nm and the WDM optical signal is transmitted for a distance of 100 km, loss in a longest wavelength side becomes larger than loss in a shortest wavelength side by approximately 1.25 dB.

Especially, as to the loss as a function of wavelength of the optical fiber in excess of 1600 nm band, it becomes larger than −0.0005 dB/nm/km, and hence the difference between the loss in the longest wavelength side and the loss in the shortest wavelength side becomes still larger.

Moreover, it is known that a stimulated Raman scattering which is one of nonlinear optical phenomena occurs in the light propagating through the optical transmission line such as the optical fiber.

The stimulated Raman scattering transfers signal power in the short wavelength side to the long wavelength side due to an interaction with optical phonon in the optical transmission line, so that signal powers between the respective channels become nonuniform to cause differences of the signal powers between the channels.

Since the signal power which is lost from the channel with the short wavelength due to the stimulated Raman scattering depends on the number of multiplexed wavelengths, channel spacing, the transmission distance and the like, the difference between the signal power of the channel in the longest wavelength side and the signal power of the channel in the shortest wavelength side becomes still larger by broadening the wavelength band or lengthening the transmission distance.

For example, when the channel spacing, the number of multiplexed wavelengths (channel number), the transmission distance and transmitting signal power per channel of the WDM optical signal are respectively set at 100 GHz, 32 channels, 100 km, +5 dBm/ch, a difference in the signal power due to the stimulated Raman scattering between the channel in the longest wavelength side and the channel in the shortest wavelength side is approximately equal to 1 dB.

It should be mentioned that, even when the WDM optical signal is transmitted by using the optical amplifier which is adjusted to have a minimum wavelength dependency of a gain, in the widened wavelength band of the WDM optical signal and the lengthened transmission distance, there occurs a difference in signal power between the channel in the longest wavelength side and the channel in the shortest wavelength side, because of the aforesaid loss as a function of wavelength and the stimulated Raman scattering in the optical transmission line. The difference leads to another difference in the optical SNR between the channel in the longest wavelength side and the channel in the shortest wavelength side, thereby limiting the transmission distance.

Hence, it is an object of the present invention to provide the optical amplifying apparatus and the complex optical amplifying apparatus which compensate a loss as a function of wavelength of the optical transmission line by a gain as a function of wavelength.

It is another object of the present invention to provide the optical communication system capable of broadening the wavelength band and lengthening the transmission distance, by using, as the optical amplifier in the repeater station, the optical amplifying apparatus and the complex optical amplifying apparatus which compensate a loss as a function of wavelength of the optical transmission line by a gain as a function of wavelength.

SUMMARY OF THE INVENTION

The above objects are achieved by an optical amplifying apparatus, wherein a gain as a function of wavelength substantially compensates a loss as a function of wavelength of an optical transmission line which propagates light to be amplified.

Further, the above objects are achieved by the optical amplifying apparatus comprising: an optical attenuating part which is provided between a first amplifying part and a second amplifying part, for attenuating output light from the first optical amplifying part; and a control part for adjusting attenuation of the optical attenuating part to a predetermined amount.

The predetermined amount is, for example, set such that a gain as a function of wavelength of the optical amplifying apparatus substantially compensates for a loss as a function of wavelength of the optical transmission line which propagates light to be amplified in the optical amplifying apparatus. The loss as a function of wavelength may be determined, for example, according to a difference in spectrum between input light and output light to/from the optical transmission line, or it may be determined in consideration of a transmission loss and a stimulated Raman scattering in the optical transmission line. Further, the optical amplifying apparatus can amplify light in every wavelength band.

Moreover, the above objects are achieved by an optical communication system comprising an optical transmitting apparatus, an optical repeating apparatus, an optical receiving apparatus, and the optical transmission line which connects the apparatuses, wherein the apparatuses are provided with the above optical amplifying apparatus.

With the optical amplifying apparatus and the optical communication system, a loss as a function of wavelength in the optical transmission line is compensated by a gain as a function of wavelength of the optical amplifying apparatus, and hence the optical SNRs of respective channels can be substantially the same in the optical receiving apparatus which receives a WDM optical signal. Further, it is possible to lengthen a transmission distance.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2 are views explaining a relationship between a gain as a function of wavelength and loss as a function of wavelength in the optical amplifying apparatus according to the first embodiment;

FIG. 7 show a level diagram and an optical SNR in the case of four repeater stations in the optical communication system according to the third embodiment;

FIG. 8 are views showing the level diagram and the optical SNR in the case of four repeater stations using conventional optical amplifying apparatuses;

FIG. 11 show the structure of an optical communication system according to a fifth embodiment;

DESCRIPTION OF THE PREFERRED EMBODIMENTS

Hereinafter, preferred embodiments of the present invention will be explained with reference to the drawings. Incidentally, the same numerals are given to the same structures in the respective drawings, and explanations thereof are omitted.

Structure of a First Embodiment

The first embodiment relates to an optical amplifying apparatus according to the present invention.

Figure 1:
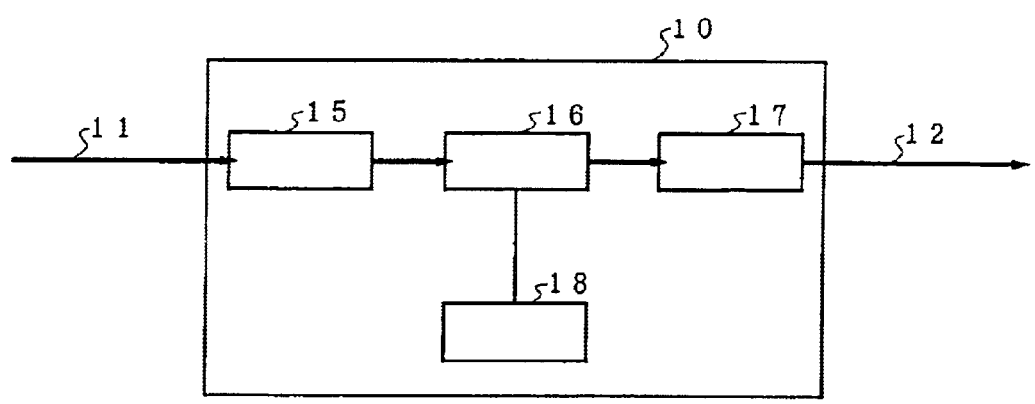
FIG. 1 shows the structure of an optical amplifying apparatus according to a first embodiment.

FIG. 1 is a view showing the structure of the optical amplifying apparatus according to the first embodiment.

As in FIG. 1, according to the first embodiment, it is structured by an optical amplifying apparatus 10 in which light outputted to an optical transmission line 12 is amplified with a gain as a function of wavelength which almost compensates for a loss as a function of wavelength of the optical transmission line 12.

The first embodiment relates to an invention in which, when the optical amplifying apparatus 10 outputs light in a certain wavelength band, a difference between a loss in a short wavelength side of the light and a loss in a long wavelength side thereof is compensated in advance.

The difference is caused due to a loss as a function of wavelength of the optical transmission line 12 while output light transmits through the optical transmission line 12. Therefore, the aforementioned optical amplifying apparatus 10 can compensate the difference in advance because the gain as a function of wavelength of the optical amplifying apparatus 10 and the loss as a function of wavelength of the optical transmission line 12 become almost reverse. That is, when the gain as a function of wavelength of the optical amplifying apparatus 10 is graphed on a plane of the wavelength (X axis)—the gain (Y axis), the gain as a function of wavelength of the optical amplifying apparatus 10 and the loss as a function of wavelength of the optical transmission line 12 are almost symmetrical with respect to a straight line which is parallel to the X axis.

In FIG. 2, for example, the cases of C-band and L-band are graphed, in which the lateral axes show the wavelength and the vertical axes show the gain. FIG. 2A shows gain compensation of the C-band and FIG. 2B shows gain compensation of the L-band. The loss in the optical transmission line 12 is calculated in consideration only of transmission loss (WDL) and loss due to a stimulated Raman scattering.

In FIGS. 2A and 2B, full lines on the upper sides show the gain as a function of wavelength of the optical amplifying apparatus 10 and full lines on the lower sides show the loss as a function of wavelength of the optical transmission line 12 due to the WDL and the stimulated Raman scattering. Further, broken lines on the upper sides show the loss as a function of wavelength of the optical transmission line 12 due to the stimulated Raman scattering, and broken lines on the lower sides show the loss as a function of wavelength of the optical transmission line 12 due to the WDL.

As shown in FIG. 2A and FIG. 2B, the gain as a function of wavelength of the optical amplifying apparatus 10 and the loss as a function of wavelength of the optical transmission line 12 are almost symmetrical with respect to straight lines which are parallel to the X axes.

It is possible to allow the optical amplifying apparatus 10 according to the first embodiment to amplify light to be made incident thereon from an optical transmission line 11 by a gain as a function of wavelength which almost compensates for a loss as a function of wavelength of the optical transmission line 11.

In the optical amplifying apparatus 10 according to the invention, when light in a certain wavelength band is made incident on the optical amplifying apparatus 10, a difference between loss in a short wavelength side of the light and loss in a long wavelength side thereof is compensated.

This loss difference is caused due to the loss as a function of wavelength of the optical transmission line 11 while the light transmits through the optical transmission line 11. Therefore, the above optical amplifying apparatus 10 can compensate the difference because the gain as a function of wavelength of the optical amplifying apparatus 10 and the loss as a function of wavelength of the optical transmission line 11 become almost reverse, as shown in FIG. 2.

Moreover, as in FIG. 1, the optical amplifying apparatus 10 of the first embodiment may be structured by including a first optical amplifying part 15 which amplifies the light, an optical attenuating part 16 which attenuates the light being amplified in the first optical amplifying part 15, a second optical amplifying part 17 which amplifies the light being attenuated in the optical attenuating part 16 and outputs it to the optical transmission line 12, and a control part 18 which controls attenuation of the optical attenuating part 16 so that the gain as a function of wavelength of the optical amplifying apparatus 10 almost compensates the loss as a function of wavelength of the optical transmission line 12.

Furthermore, as in FIG. 1, the optical amplifying apparatus 10 may be structured by including the first optical amplifying part 15 which amplifies the light to be made incident thereon from the optical transmission line 11, the optical attenuating part 16 which attenuates the light being amplified in the first optical amplifying part 15, the second optical amplifying part 17 which amplifies the light being attenuated in the optical attenuating part 16, and the control part 18 which controls the attenuation of the optical attenuating part 16 so that the gain as a function of wavelength of the optical amplifying apparatus 10 almost compensates the loss as a function of wavelength of the optical transmission line 11.

First, the gain as a function of wavelength of the optical amplifying part will be explained.

Figure 3:
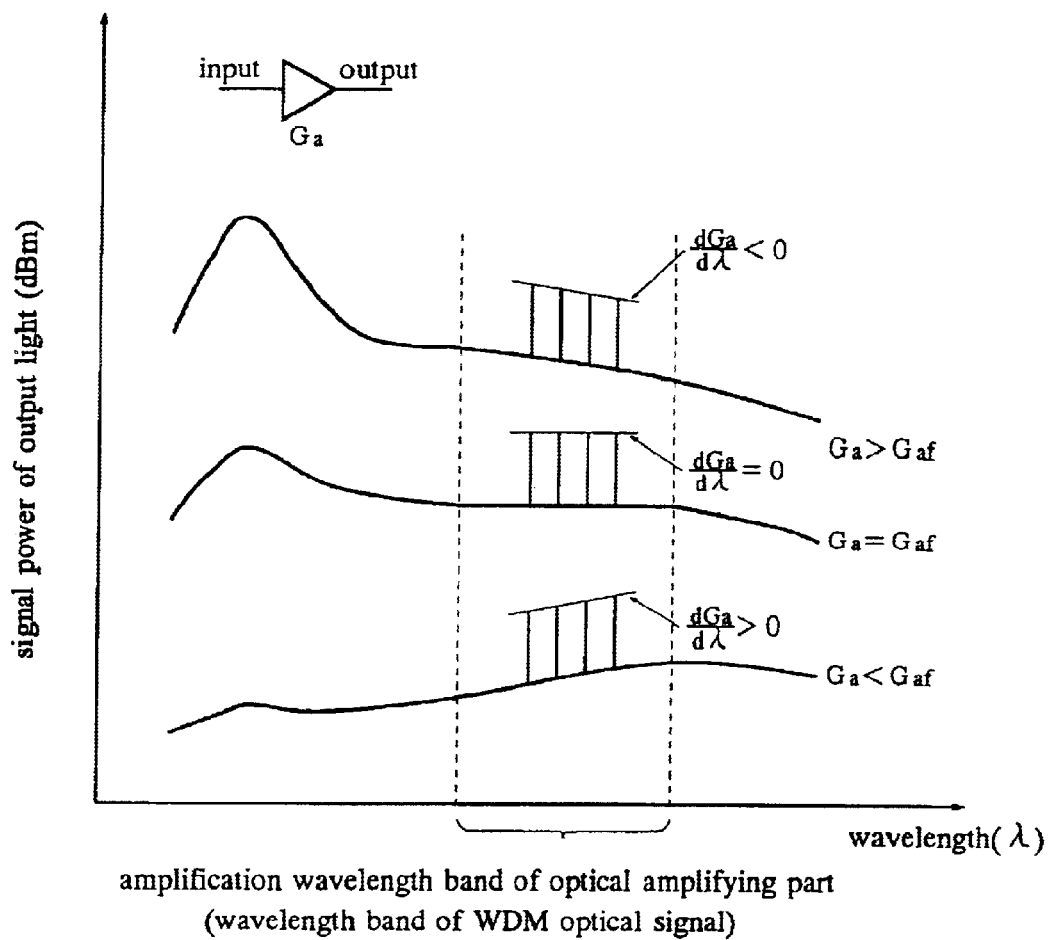
FIG. 3 shows a relationship between a gain and the gain as a function of wavelength of an optical amplifying part.

FIG. 3 is a view showing a relationship between the gain and the gain as a function of wavelength of the optical amplifying part.

It should be mentioned that the lateral axis of FIG. 3 shows the wavelength and the vertical axis thereof shows signal power of output light of the optical amplifying part.

As shown as a middle curve in FIG. 3, if we set a gain Ga of the optical amplifying part as a certain gain Gaf, the gain as a function of wavelength is flattened in an amplification wavelength band to amplify a WDM optical signal.

Moreover, as shown as an upper curve, if we set the gain Ga of the optical amplifying part larger than the gain Gaf, a gain wavelength band inclines negatively ($dGa/d\lambda<0$) in the amplification wavelength band to amplify the WDM optical signal. Further, the inclination ($|dGa/d\lambda|$) depends on the gain Ga.

Meanwhile, as shown as a lower curve, if we set the gain Ga of the optical amplifying part smaller than the gain Gaf, the gain wavelength band inclines positively ($dGa/d\lambda>0$) in the amplification wavelength band to amplify the WDM optical signal. Further, the inclination ($|dGa/d\lambda|$) depends on the gain Ga.

In the above structure, when the total of the gain of the first optical amplifying part 15 and the gain of the second optical amplifying part 17 is constant, the gain as a function of wavelength becomes almost the same. Further, the loss as a function of wavelength of the optical attenuating part 16 is almost flat irrespective of its attenuation.

Hence, in the above structure, the sum of the gains of the first optical amplifying part 15 and the second optical amplifying part 17 is selected to obtain a required inclination. Since it is preferable to keep constant mean values of outputs of respective channels to the optical transmission line 12 while maintaining the sum value of the gains, the attenuation of the optical attenuating part 16 is adjusted to obtain the required output from the optical amplifying apparatus 10.

Meanwhile, in changing an inclination amount, the sum of the gains of the first optical amplifying part 15 and the second optical amplifying part 17 is changed by an amount corresponding to the change in the inclination amount. Further, the attenuation of the optical attenuating part 16 is adjusted so that the output from the optical amplifying apparatus 10 is kept constant.

As to the change of the sum of the gains, either the first optical amplifying part 15 or the second optical amplifying part 17 may be changed, or the change may be distributed respectively to the first optical amplifying part 15 and the second optical amplifying part 17 in a certain ratio.

In the structure as described above, the optical amplifying apparatus 10 can change the gain as a function of wavelength to a predetermined value.

Therefore, the optical amplifying apparatus 10 can compensate the loss difference because the gain as a function of wavelength of the optical amplifying apparatus 10 and the loss as a function of wavelengths of the optical transmission lines 11, 12 become almost reverse in the predetermined wavelength band, as shown in FIG. 2.

Moreover, in the optical amplifying apparatus 10, it is preferable to determine the loss as a function of wavelength in accordance with a difference in spectrum between the light to be made incident on the optical transmission lines 11, 12 and the light to be outputted therefrom.

The main reasons for the occurrence of the loss as a function of wavelength of the optical transmission lines 11, 12 are the transmission loss and the stimulated Raman scattering. In thus-structured optical amplifying apparatus 10, the loss as a function of wavelength is subjected to a linear approximation, and the gradient of the approximated straight line is determined by the difference between the spectrum of the light to be made incident on the optical transmission lines 11, 12 and the spectrum of the light to be outputted therefrom.

Further, the gain as a function of wavelength of the optical amplifying apparatus 10 is inclined oppositely to the determined inclination, thereby compensating the loss as a function of wavelengths of the optical transmission lines 11, 12.

The opposite inclination means the inclination whose absolute value is equal to the determined inclination and whose sign is opposite thereto.

A method of determining the loss as a function of wavelength of the optical transmission lines 11, 12 due to the transmission loss and the stimulated Raman scattering will be explained.

First, transmission loss $\Delta T\!fib$ of the optical transmission lines 11, 12 is determined.

Letting a differential coefficient of loss as a function of wavelength $T\!fib$ with a wavelength $\lambda$ as $(dT\!fib/d\lambda)$, which is subjected to a first approximation, the transmission loss $\Delta T\!fib$ in the optical transmission lines 11, 12 can be expressed as:

$$\Delta T\!fib = (n-1)\Delta\lambda Lspan\frac{dT\!fib}{d\lambda} \qquad (1)$$

Here, n is a multiplex number (channel number) of the WDM optical signal. $\Delta\lambda$ is a wavelength interval between the respective channels. Lspan is a transmission distance of the targeted WDM optical signals, that is, the lengths of the optical transmission lines 11, 12.

Next, a stimulated Raman scattering $\Delta$Gram is determined.

With reference to A. R. Chraplyvy: "Optical Power Limits in Multichannel Wavelength-Division-Multiplexed Systems due to Stimulated Raman Scattering" Electronics Letters 19th. Jan. 1984 Vol. 20, p. 58–59, when a channel j of the WDM optical signal interacts with all the remaining channels due to the stimulated Raman scattering, the gain Gj due to the stimulated Raman scattering can be expressed generally as:

$$Gj = 1 + Dj \qquad (2)$$

$$Dj = \sum_i \left(\frac{\lambda_i}{\lambda_j}\right) \times \left(\frac{Pi\Delta f\gamma p}{1.5 \times 10^{13}}\right) \times \left(\frac{L_{eff}}{2A_{eff}}\right) \times (j-i) \qquad (3)$$

Incidentally, in the (formula 2) and (formula 3), a Raman gain coefficient in the optical transmission lines 11, 12 is subjected to a triangular approximation.

Here, when the channels are numbered from the short wavelength side and supposing that the channel number is i, $\lambda i$ and Pi are the wavelength and the signal power of the ith channel, respectively. $\Delta f$ is a frequency interval between the respective channels. $\gamma p$ is a peak gain coefficient as a maximum value of the Raman gain coefficient when it is subjected to the triangular approximation. Aeff is an effective core cross-sectional area of the optical transmission line. As to Leff, letting a loss coefficient of the optical transmission line is $\alpha$ with the effective length of the optical transmission line, Leff=$(1-\exp(-\alpha\times Lspan))/\alpha$.

Further, in the WDM optical signal with its multiplex number n (channel number n), a difference $\Delta$Gram between a channel 1 and a channel n can be expressed as:

$$\Delta Gram = G_n - G_1 \qquad (4)$$

Therefore, the difference in the optical transmission lines 11, 12 due to the stimulated Raman scattering can be determined by using the (formula 2) to the (formula 4).

Meanwhile, signal power lost in the channel 1 of the WDM optical signal can be expressed as:

$$G_1 = 1 + D_1 \qquad (5)$$

Moreover, in the (formula 3), when all the channels of the WDM optical signal are within a frequency band to receive the stimulated Raman scattering, and all signal powers Pi of the respective channels are equal to each other as P, and in making approximations to $(\lambda i/\lambda j)=1$, the (formula 3) can be expressed as:

$$D_1 = \left(\frac{n(n-1)}{2}\right) \times \left(\frac{P\Delta f\gamma p}{1.5 \times 10^{13}}\right) \times \left(\frac{L_{eff}}{2A_{eff}}\right) \qquad (6)$$

Furthermore, supposing that a ratio of energy which is received by a channel in the shortest wavelength side and a channel in the longest wavelength side is equal to each other, a difference in signal powers of the channel in the shortest wavelength side and the channel in the longest wavelength side after the transmission can be approximated to:

$$\Delta Gram = 10\log\left|\frac{1+D_1}{1-D_1}\right| \qquad (7)$$

Since loss as a function of wavelength $\Delta$Loss of the optical transmission lines 11, 12 is due to the transmission loss $\Delta T\!fib$ and the stimulated Raman scattering $\Delta$Gram, it can be expressed as:

$$\Delta Loss = \Delta T\!fib - \Delta Gram \qquad (8)$$

Since the loss as a function of wavelength may be compensated by a gain as a function of wavelength $\Delta$Gain of the optical amplifying apparatus 10, it is suitable to make it hold for:

$$\Delta Gain = Gain\,(n) - Gain\,(1) = \Delta Loss \qquad (9)$$

Therefore, the inclination of the gain as a function of wavelength $\Delta$Gain of the optical amplifying apparatus 10 may be adjusted so that it becomes an inclination SL which is the $\Delta$Loss divided by a difference in the wavelengths between the channel in the shortest wavelength side and the channel in the longest wavelength side $(\lambda(n)-\lambda(1))$, that is, the inclination SL expressed as:

$$SL = \frac{\Delta Loss}{\lambda(n) - \lambda(1)} \qquad (10)$$

Since the loss as a function of wavelength is the loss as a function of wavelength due to the transmission loss and the stimulated Raman scattering in the optical transmission lines 11, 12, the optical amplifying apparatus 10 may determine the loss as a function of wavelength in accordance with the transmission lengths of the optical transmission lines 11, 12.

As is clear from the above (formula 1), the (formula 3) and the (formula 6), both the transmission loss $\Delta$Tfib and the stimulated Raman scattering $\Delta$Gram are functions of Lspan, Leff which are the amounts relating to the transmission length. For this reason, the loss as a function of wavelength $\Delta$Loss of the optical transmission lines 11, 12 can be determined by a combination of the (formula 1), (formula 2), (formula 3), (formula 4) and (formula 8), or a combination of the (formula 1), (formula 5), (formula 6), (formula 7) and (formula 8).

The inclination SL is determined by thus-determined $\Delta$Loss, thereby adjusting the inclination of the optical amplifying apparatus 10.

Further, the loss as a function of wavelength is caused due to the transmission loss and the stimulated Raman scattering in the optical transmission lines 11, 12, and hence the optical amplifying apparatus 10 may determine the lengths of the optical transmission lines 11, 12 from the difference between the mean signal power of the light to be made incident on the optical transmission lines 11, 12 and the mean signal power of the light to be outputted therefrom, thereby determining the loss as a function of wavelength in accordance with the determined lengths.

When the lengths of the optical transmission lines 11, 12 are unknown, the difference between the mean signal power of the light to be made incident on the optical transmission lines 11, 12 and the mean signal power of the light to be outputted therefrom is divided by the loss coefficient in the optical transmission lines 11, 12 to determine the lengths, and the $\Delta$Loss is determined by the lengths. Further, the inclination SL is determined by thus-determined $\Delta$Loss, thereby adjusting the inclination of the optical amplifying apparatus 10.

Further, when the light to be amplified is the WDM optical signal in which a plurality of optical signals having the different wavelengths from each other is wavelength-multiplexed, the loss as a function of wavelength of the optical transmission lines 11, 12 is caused due to the transmission loss and the stimulated Raman scattering, and the optical amplifying apparatus 10 may determine the loss as a function of wavelength in accordance with the lengths of the optical transmission lines 11, 12, the multiplex number (channel number) of the WDM optical signal, and signal power of the light which is made incident on the optical transmission lines 11, 12.

The length, the multiple number and the signal power to be made incident are respectively substituted into Leff, n and P of the (formula 6) so that the loss as a function of wavelength $\Delta$Loss can be determined by the combination of the (formula 1), (formula 5), (formula 6), (formula 7) and (formula 8).

Then, the inclination SL is determined by thus-determined $\Delta$Loss, thereby adjusting the inclination of the optical amplifying apparatus 10.

Further, when the light to be amplified is the WDM optical signal, the loss as a function of wavelength of the optical transmission lines 11, 12 is caused due to the transmission loss and the stimulated Raman scattering, and the optical amplifying apparatus 10 may determine the lengths of the optical transmission lines 11, 12 by the difference between the mean signal power of the light to be made incident on the optical transmission lines 11, 12 and the mean signal power of the light which is outputted therefrom, and determine the loss as a function of wavelength in accordance with thus-determined lengths, the multiplex number of the WDM optical signal, and the signal power of the light to be made incident on the optical transmission lines 11, 12.

When the lengths of the optical transmission lines 11, 12 are unknown, the difference between the mean signal power of the light to be made incident on the optical transmission lines 11, 12 and the mean signal power of the light to be outputted therefrom is divided by the loss coefficient in the optical transmission lines 11, 12 to determine the lengths, and the $\Delta$Loss is determined by the lengths. Further, the inclination SL is determined by thus-determined $\Delta$Loss, thereby adjusting the inclination of the optical amplifying apparatus 10.

As described above, by adjusting the optical amplifying apparatus 10, the light which is made incident on the optical amplifying apparatus 10 from the optical transmission line 11 can be almost flattened. For this reason, when the incident light is the WDM optical signal, optical SNRs between the respective channels are allowed to be almost the same. Hence, longer distance transmission can be realized.

It should be noted that, in an optical communication system which includes an optical transmitting apparatus for generating a WDM optical signal in which a plurality of optical signals is multiplexed, an optical receiving apparatus for receiving and processing the WDM optical signal, an optical transmission line for transmitting the WDM optical signal between the optical transmitting apparatus and the optical receiving apparatus, and an optical repeating apparatus provided in the optical transmission line, for amplifying the WDM optical signal, when the optical transmitting apparatus, the optical repeating apparatus and the optical receiving apparatus are structured by including the above optical amplifying apparatus 10, the optical SNRs between the respective channels are allowed to be almost the same by the optical amplifying apparatus. Therefore, in the above optical communication system, the long distance transmission with a small error ratio can be realized.

Next, another embodiment will be explained.

Second Embodiment

Figure 4:
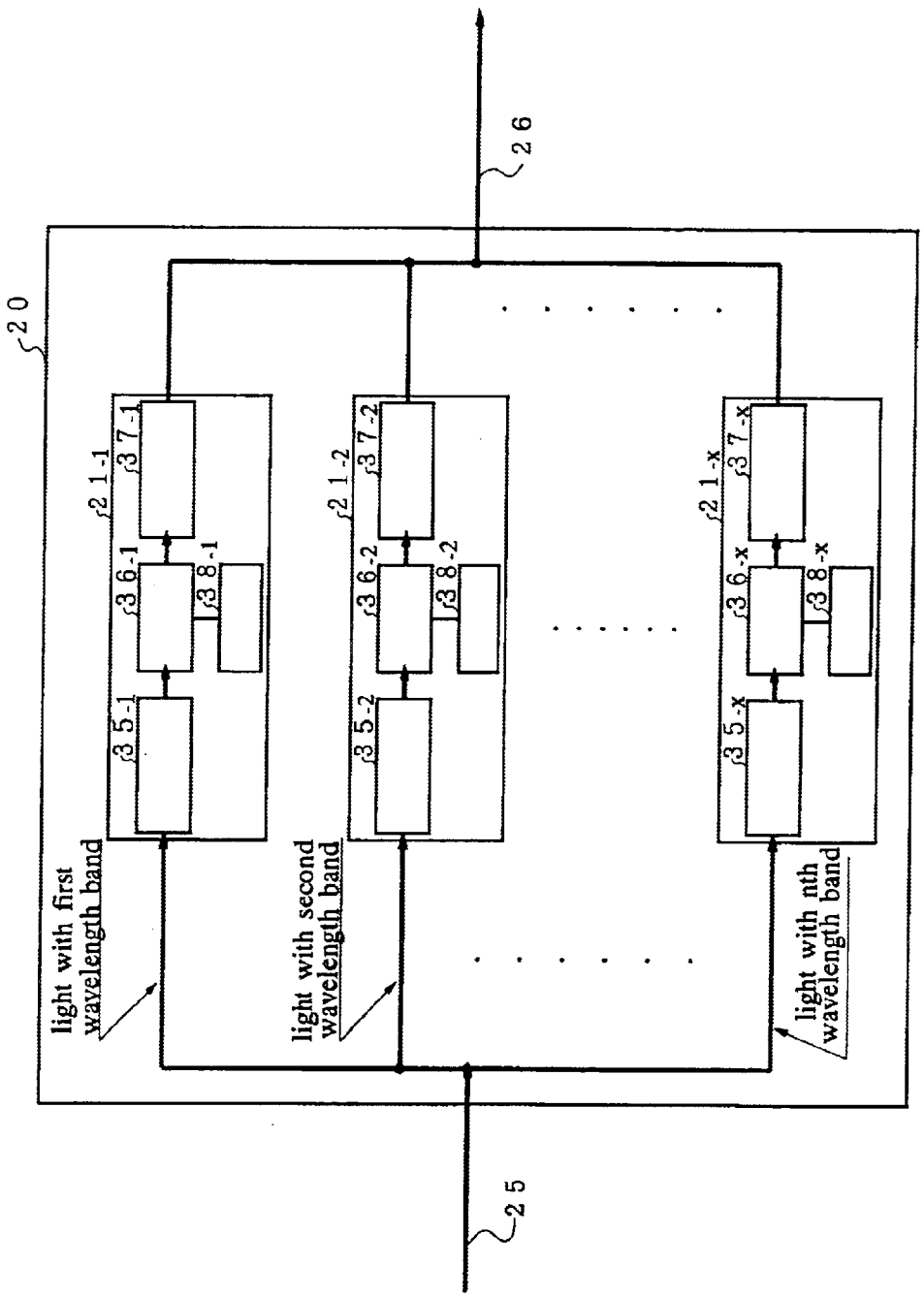
FIG. 4 shows the structure of a complex optical amplifying apparatus according to a second embodiment.

FIG. 4 is a view showing the structure of an optical amplifying apparatus according to the second embodiment.

As in FIG. 4, in a complex optical amplifying apparatus 20 according to the second embodiment, for wavelength-multiplexing outputs from a plurality of optical amplifying parts 21 which have different wavelength bands to amplify light from each other and outputting it to an optical transmission line 26, each of the plurality of the optical amplifying parts 21 is structured to amplify the light to be amplified with a gain as a function of wavelength which almost compensates for a loss as a function of wavelength of the optical transmission line 26.

Since (formula 1) to (formula 10) holds also for a WDM optical signal in which optical signals are set in a plurality of the wavelength bands corresponding to the plurality of the optical amplifying parts 21, a compensation amount SL can be determined similarly to the above. Hence, the optical amplifying parts 21 are adjusted by the compensation amount SL, thereby compensating the loss as a function of wavelength of optical transmission lines 25, 26.

Incidentally, in the second embodiment, in the complex optical amplifying apparatus 20 for demultiplexing light from an optical transmission line 25 into lights with a plurality of the wavelength bands different from each other, and for amplifying the lights in each wavelength band in the plurality of the optical amplifying parts 21 corresponding to the wavelength bands, each of the plurality of the optical amplifying parts 21 may be structured to amplify the light to be amplified with a gain as a function of wavelength which almost compensates for a loss as a function of wavelength of the optical transmission line 25.

Moreover, in the complex optical amplifying apparatus 20, each of the plurality of optical amplifying parts 21 may be structured by including a first optical amplifying part 35 which amplifies the light, an optical attenuating part 36 which attenuates the light being amplified in the first optical amplifying part 35, a second optical amplifying part 37 which amplifies the light being attenuated in the optical attenuating part 36, and a control part 38 which controls attenuation of the optical attenuating part 36 so that the gain as a function of wavelength of the optical amplifying part 21 almost compensates the loss as a function of wavelength of the optical transmission lines 25, 26.

Further, the loss as a function of wavelength is caused due to a transmission loss and a stimulated Raman scattering in the optical transmission lines 25, 26, and hence the complex optical amplifying apparatus 20 may determine the loss as a function of wavelength in accordance with a spectrum of the light to be made incident on the optical transmission lines 25, 26 and a spectrum of the light to be outputted therefrom.

Furthermore, in an optical communication system which includes an optical transmitting apparatus which generates a WDM optical signal in which a plurality of optical signals is multiplexed, an optical receiving apparatus which receives and processes the WDM optical signal, an optical transmission line which transmits the WDM optical signal between the optical transmitting apparatus and the optical receiving apparatus, and an optical repeating apparatus which is placed in the optical transmission line and amplifies the WDM optical signal, when the optical transmitting apparatus, the optical repeating apparatus and the optical receiving apparatus are structured by including the above complex optical amplifying apparatus 20, the WDM signal with high multiplicity can be transmitted and further, optical SNRs between the respective channels are allowed to be almost the same by the complex optical amplifying apparatus 20. Therefore, in the above optical communication system, the long distance transmission with high capacity and a small error ratio can be realized.

Next, another embodiment will be explained.

Structure of a Third Embodiment

The third embodiment is an embodiment of an optical communication system according to the present invention. In the optical communication system of the third embodiment, a 32-wave WDM optical signal is transmitted between two terminal stations while being amplified by a plurality of optical amplifying apparatuses in sequence according to the present invention.

Figure 5:
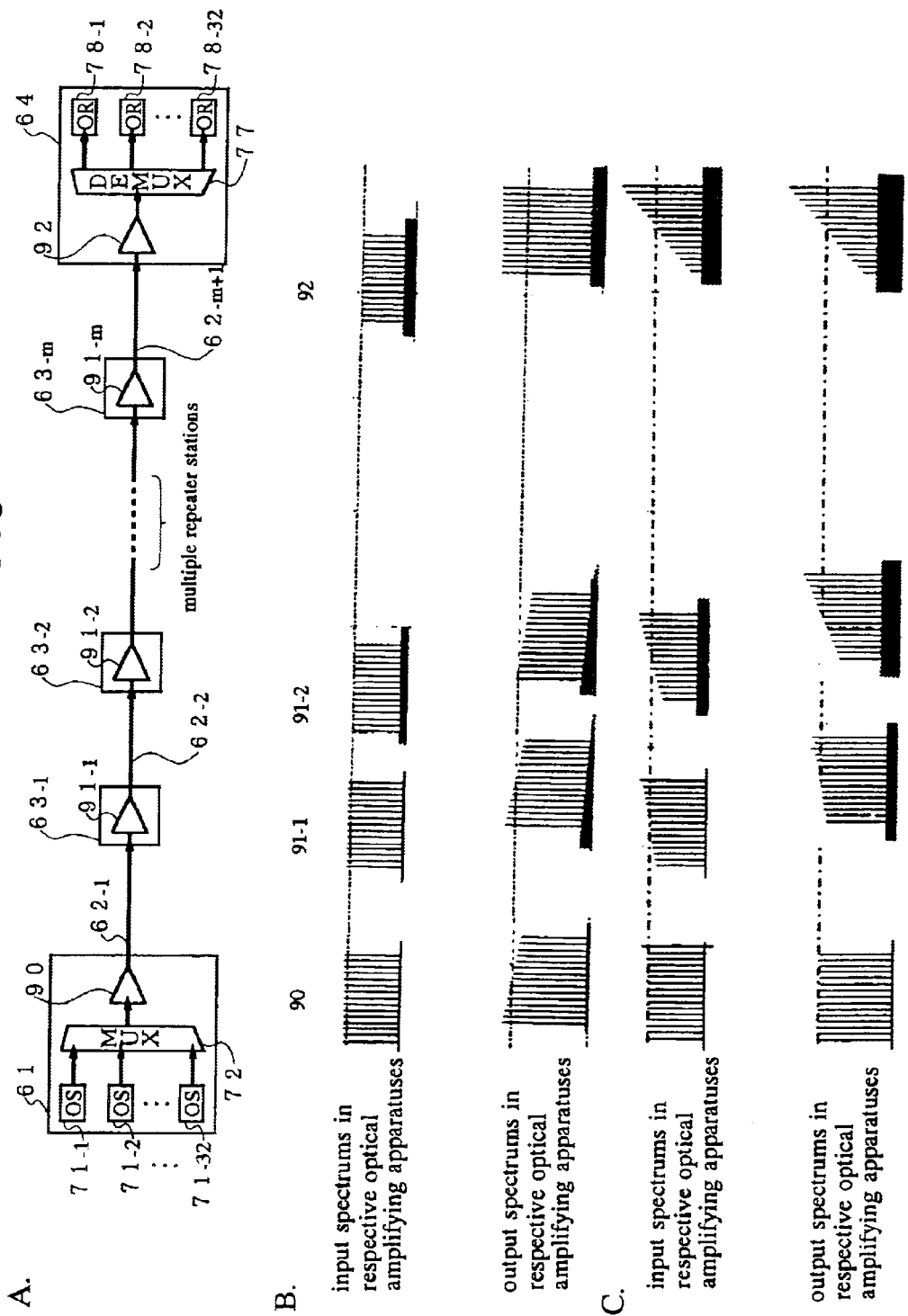
FIG. 5A shows the structure of the optical communication system according to the third embodiment.
FIG. 5B shows input spectrums and output spectrums in the respective optical amplifying apparatuses in the optical communication system according to the third embodiment.
FIG. 5C shows input spectrums and output spectrums in the respective optical communication apparatuses in an optical communication system structured similarly to the third embodiment.

FIG. 5 are views showing the structure of the optical communication system according to the third embodiment and spectrums of the WDM optical signal.

FIG. 5A shows the structure of the optical communication system according to the third embodiment. FIG. 5B shows input spectrums and output spectrums in the respective optical amplifying apparatuses in the optical communication system according to the third embodiment, when the optical amplifying apparatuses according to the present invention are used. Moreover, in order to compare the optical amplifying apparatus of the present invention with a conventional optical amplifying apparatus, FIG. 5C shows input spectrums and output spectrums in the respective optical amplifying apparatuses in an optical communication system structured similarly to the third embodiment, when the conventional optical amplifying apparatuses are used. It should be noted that longitudinal broken lines of the input spectrums of FIG. 5B and FIG. 5C show mean input signal power of the WDM optical signal in respective optical amplifying apparatuses 90, 91, 92, and longitudinal broken lines of the output spectrums of FIG. 5B and FIG. 5C show mean output signal power of the WDM optical signal in the respective optical amplifying apparatuses 90, 91, 92.

Figure 6:
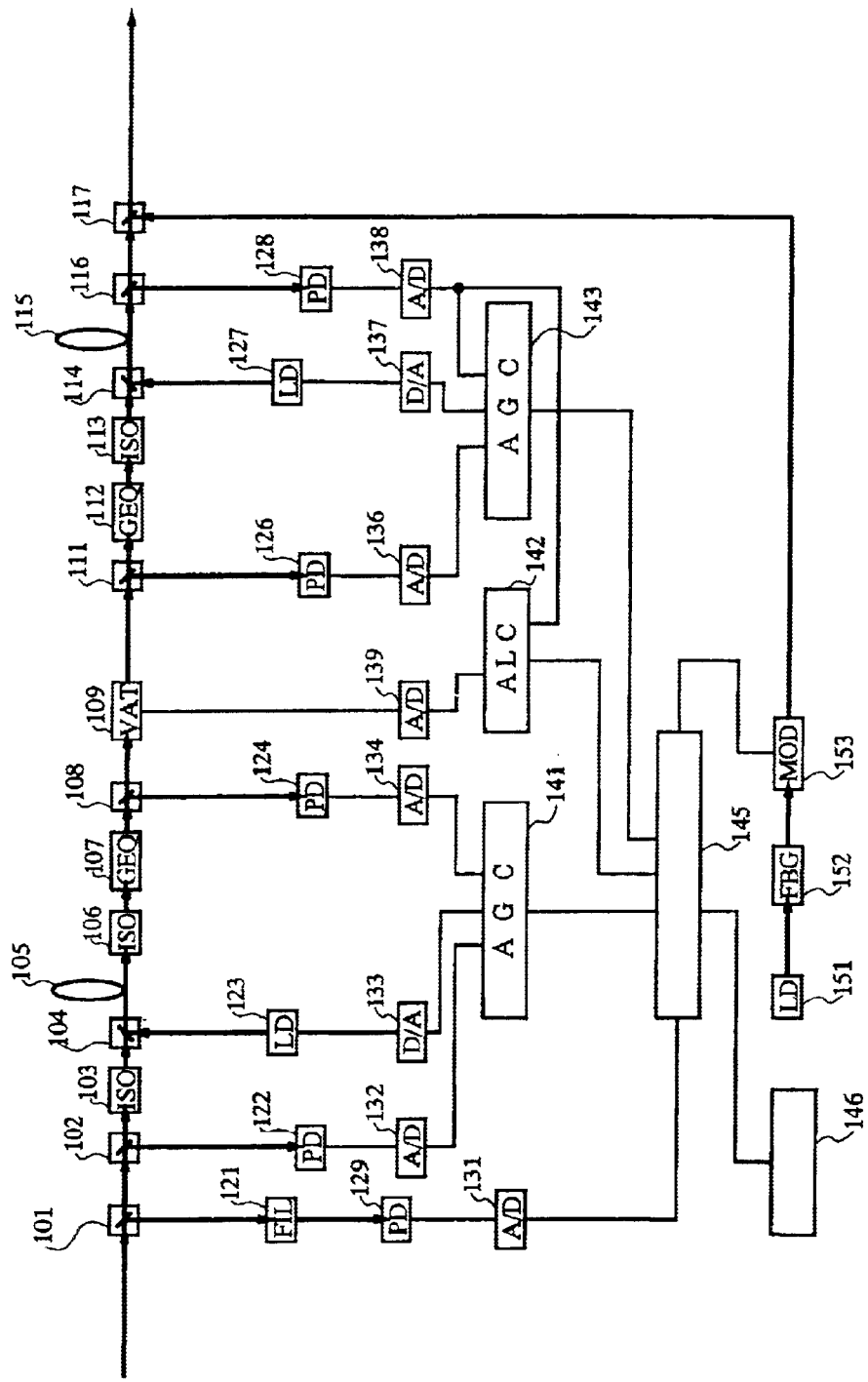
FIG. 6 shows the structure of an optical amplifying apparatus in the optical communication system according to the third embodiment.

FIG. 6 is a view showing the structure of the optical amplifying apparatus in the optical communication system according to the third embodiment.

FIG. 7 are views showing a level diagram and an optical SNR in the case of four repeater stations in the optical communication system according to the third embodiment.

FIG. 8 are views showing a level diagram and an optical SNR in the case of four repeater stations using the conventional optical amplifying apparatuses.

FIG. 7A and FIG. 8A show the level diagram, in which vertical axes show signal power of the respective channels (dB) and lateral axes show a distance (km) with a repeater station 1 as "0". FIG. 7B and FIG. 8B show the optical SNR, in which vertical axes show the optical SNR (dB) and lateral axes show a distance (km) with the repeater station 1 as "0"Further, in the respective drawings, "■" is a channel 1, "♦" is a channel 17 and "▲" is a channel 32.

As in FIG. 5A, the optical communication system according to the third embodiment includes an optical transmitting station 61 which generates the WDM optical signal and sends it out, an optical transmission line 62 which transmits the WDM optical signal being sent out, and an optical receiving station 64 which receives the transmitted WDM optical signal. Further, a plurality of repeater stations 63 having optical amplifying apparatus 91 are provided at some midpoints in the optical transmission line 62.

The optical transmitting station 61 is structured by optical senders (hereinafter abbreviated to "OS") 71, an optical multiplexer (hereinafter abbreviated to "MUX") 72 and an optical amplifying apparatus 90.

The respective OSs 71 generate optical signals with different wavelengths from each other. Each OS 71 can be structured by, for example, a semiconductor laser from which laser light with a predetermined wavelength is oscillated and an external modulator, such as a Mach-Zehnder interferometer type optical modulator, which modulates the incident laser light according to information to be transmitted.

The MUX 72 wavelength-multiplexes the plurality of the optical signals which are made incident on the MUX 72 from the OSs 71, and generates the WDM optical signal. As the MUX 72, for example, a dielectric multilayered film filter which is one of interference filters, an arrayed waveguide grating and the like can be used. This applies to a later-described DEMUX 77.

The optical amplifying apparatus 90 is the optical amplifying apparatus according to the present invention, for amplifying the WDM optical signal which is made incident on the optical amplifying apparatus 90 from the MUX 72 and outputting it to an optical transmission line 62-1 The structure of the optical amplifying apparatus 90 will be described later.

In the repeater station 63, the WDM optical signal which is transmitted from the optical transmitting station 61 or the repeater station 63 on its preceding stage through the optical transmission line 62 is amplified by the optical amplifying apparatus 91 according to the present invention. Further, the WDM optical signal is outputted from the repeater station 63 to the optical transmission line 62 so that the WDM optical signal is transmitted to the repeater station 63 on the next stage or the optical receiving station 64. The structure of the optical amplifying apparatus 91 will be described later.

The optical receiving station 64 is structured by an optical amplifying apparatus 92, an optical demultiplexer (hereinafter abbreviated to "DEMUX") 77 and optical receivers (hereinafter abbreviated to "OR") 78.

The optical amplifying apparatus 92 is the optical amplifying apparatus according to the present invention, for amplifying the WDM optical signal which is made incident from a repeater station m63-m on its preceding stage through an optical transmission line 62-m+1 on the optical receiving station 64. The structure of the optical amplifying apparatus 92 will be described later.

In the DEMUX 77, the wavelength of the WDM optical signal which is made incident from the optical amplifying apparatus 92 on the DEMUX 77 is demultiplexed, and thus-demultiplexed optical signals are respectively outputted to ORs 78-1 to 78-32. Thirty-two ORs 78 are prepared, in which the incident optical signals are demodulated and information is taken out therefrom.

Incidentally, the numbers of the OSs 71 and the ORs 78 correspond to the multiplex number of the WDM optical signal. Hence, when the multiplex number of the WDM optical signal which is operated in the optical communication system is changed, the numbers of the OSs 71 and the ORs 78 are changed in accordance with the multiplex number.

Next, the optical amplifying apparatuses 90, 91, 92 will be explained. First, the optical amplifying apparatus 91 will be explained, and only the difference between the optical amplifying apparatuses 90, 92 and the optical amplifying apparatus 91 will be explained.

In FIG. 6, the WDM optical signal from the repeater station 63 on the preceding stage is made incident on a WDM coupler 101 in the optical amplifying apparatus 91.

In the WDM coupler 101, the wavelength of the incident WDM optical signal is demultiplexed to an optical signal part 15 which is from a channel 1 to a channel 32 as a main part 15 of the WDM optical signal and an OSC (optical supervisory channel).

The OSC is a supervisory signal for communicating information such as maintenance information and status information and the like which are necessary for operating the optical communication system. The OSC is set either in a shorter wavelength side than the channel 1 or in a longer wavelength side than the channel 32.

The OSC whose wavelength is demultiplexed in the WDM coupler 101 is made incident on a band pass optical filter (hereinafter abbreviated to "FIL") 121 whose center wavelength of a pass wavelength band is set to the wavelength of the OSC. Only the OSC can be properly removed by passing through the FIL 121. As the FIL 121, an optical filter such as the dielectric multilayered film filter and a fiber grating filter can be used.

Light from the FIL 121 is made incident on a photodiode (hereinafter abbreviated to "PD") 129 which generates a current corresponding to signal power of the incident light, and subjected to a photoelectric conversion. An output from the PD 129 is inputted into an analog/digital converter (hereinafter abbreviated to "A/D") 131 which converts an analog signal into a digital signal, and converted into the digital signal. An output from the A/D 131 is inputted into a control circuit 145.

Meanwhile, the WDM optical signal of the channel 1 to the channel 32 which is demultiplexed in the WDM coupler 101 is made incident on an optical coupler (hereinafter abbreviated to "CPL") 102.

In the CPL 102, the WDM optical signal is divided into two. As the CPL 102, for example, a microoptic optical coupler such as a half mirror, an optical fiber type optical coupler of a fused fiber, an optical waveguide type optical coupler and the like can be used. This applies to the other CPLs which will be described later.

One of the WDM optical signals which are divided in the CPL 102 is made incident on a PD 122 and subjected to the photoelectric conversion. The PD 122 measures mean input signal power of the WDM optical signal to an erbium-doped optical fiber 105. An output from the PD 122 is also mean input signal power of the WDM optical signal to the repeater station 63. The erbium-doped optical fiber (hereinafter abbreviated to "EDF") 105 will be described later.

The output from the PD 122 is inputted into the A/D 132 and converted into the digital signal. Then, an output from the A/D 132 is inputted into an automatic gain controller (hereinafter abbreviated to "AGC") 141.

Further, the other WDM optical signal which is divided in the CPL 102 is made incident on an optical isolator (hereinafter abbreviated to "ISO") 103 which passes through the light only in one direction.

The ISO 103 prevents light which is reflected by, for example, a connecting part of respective optical components in the optical amplifying apparatus 91 from being propagated to the end. Particularly, when the reflected light is returned to the semiconductor laser, the semiconductor laser is induced by the reflected light with various phases and amplitudes, whereby its oscillation mode is changed and a noise is generated. These adverse effects are prevented by the ISO 103. The ISO 103 can be structured by disposing a Faraday rotator between two polarizers which are deviated by 45 degrees from each other. This applies to the other ISOs which will be described later.

The WDM optical signal from the ISO 103 is made incident on a CPL 104.

Moreover, laser light with a wavelength to excite the EDF 105 is oscillated by a laser diode (hereinafter abbreviated to "LD") 123. Several exciting wavelengths of the EDF 105 are known, but 980 nm or 1480 nm is selected in order to amplify a 1550 nm band as the wavelength band of the WDM optical signal. As the LD 123, for example, various semiconductor lasers such as a Fabry-Perot semiconductor laser, a distributed feedback laser, a distributed Bragg-reflection type laser and the like can be used.

The laser light from the LD 123 is input to the CPL 104 and combined with the WDM optical signal from the aforesaid ISO 103. The combined laser light and WDM optical signal is input to the EDF 105.

The EDF 105 forms an inverted population by being supplied with energy from the laser light, causes induced radiation when the WDM optical signal to be amplified is made incident thereon under this situation, and amplifies the WDM optical signal. A gain of the EDF 105 depends on signal power of the laser light from the LD 123, and the gain becomes smaller when the signal power of the laser light is small and the gain becomes larger when the signal power of the laser light is large.

The WDM optical signal from the EDF 105 is made incident on a gain equalizer (hereinafter abbreviated to "GEQ") 107 through an ISO 106.

The GEQ 107 is an optical filter for compensating a gain as a function of wavelength of the EDF 105. It is possible to allow the shape of loss as a function of wavelength of the optical filter to be almost the same with that of the gain as a function of wavelength of the EDF 105.

The WDM optical signal from the GEQ 107 is made incident on a CPL 108.

The WDM optical signal is divided in the CPL 108, and one of these is made incident on a PD 124 to be subjected to the photoelectric conversion. The PD 124 measures mean output signal power of the WDM optical signal to the EDF 105. An output from the PD 124 is also mean input signal power of the WDM optical signal to a later-described optical variable attenuator 109.

The output from the PD 124 is inputted into an A/D 134 to be converted into the digital signal. Then, an output from the A/D 134 is inputted into the AGC 141.

In the AGC 141, the gain of the EDF 105 is measured by the mean input signal power of the WDM optical signal which is from the aforesaid A/D 132 to the EDF 105 and the mean output signal power of the WDM optical signal which is from the A/D 134 to the EDF 105. Further, the AGC 141 controls the gain of the EDF 105 to a predetermined gain by increasing/decreasing a drive current (injected current) of the LD 123 through a D/A converter (hereinafter abbreviated to "D/A") 133 which converts the digital signal into the analog signal. The predetermined gain of the EDF 105 is designated by the control circuit 145.

Moreover, the other WDM optical signal which is divided in the CPL 108 is made incident on the optical variable attenuator (hereinafter abbreviated to "VAT") 109.

The WDM optical signal from the VAT 109 is made incident on a CPL 111. As the VAT 109, for example, an optical variable attenuator in which an attenuation disc is inserted between incident light and output light and a metallic attenuation film is deposited on a surface of the attenuation disc with its thickness varying successively in its rotating direction, for adjusting attenuation by rotating the attenuation disc, an optical variable attenuator in which a magnetooptic crystal is inserted between the incident light and the output light and a polarizer is inserted to the magnetooptic crystal in its output side, for adjusting the attenuation by impressing a magnetic field to the magnetooptic crystal and changing the intensity of the magnetic field and the like can be used.

The WDM optical signal is divided in the CPL 111, and one of these is made incident on a PD 126 to be subjected to the photoelectric conversion. The PD 126 measures mean input signal power of the WDM optical signal to an EDF 115. An output from the PD 126 is inputted into an A/D 136 to be converted into the digital signal. An output from the A/D 136 is inputted into an AGC 143. Further, the other WDM optical signal which is divided in the CPL 111 is made incident on a CPL 114 through a GEQ 112 and an ISO 113.

The GEQ 112 is an optical filter for compensating a gain as a function of wavelength of the EDF 115. It is possible to allow the shape of loss as a function of wavelength of the optical filter to be almost the same with that of the gain as a function of wavelength of the EDF 115.

Moreover, an LD 127 oscillates laser light with a wavelength which excites the EDF 115. The laser light from the LD 127 is made incident on the CPL 114 and combined with the WDM optical signal from the aforesaid ISO 113. The combined laser light and the WDM optical signal are made incident on the EDF 115 to amplify the WDM optical signal. A gain of the EDF 115 depends on signal power of the laser light from the LD 127, and the gain becomes smaller, the smaller the signal power of the laser light is and the gain becomes larger, the larger the signal power of the laser light is. The WDM optical signal from the EDF 115 is made incident on a CPL 116.

The WDM optical signal is divided in the CPL 116, and one of these is made incident on a PD 128 to be subjected to the photoelectric conversion. The PD 128 measures mean output signal power of the WDM optical signal to the EDF 115. An output from the PD 128 is also mean input signal power of the WDM optical signal to the repeater station 63.

The output from the PD 128 is inputted into an A/D 138 to be converted into the digital signal. Further, an output from the A/D 138 is inputted into the AGC 143 and an ALC 142.

In the AGC 143, the gain of the EDF 115 is measured by the mean input signal power of the WDM optical signal which is from the aforesaid A/D 136 to the EDF 115 and the mean output signal power of the WDM optical signal which is from the A/D 138 to the EDF 115. Further, the AGC 143 controls the gain of the EDF 115 to a predetermined gain by increasing/decreasing a drive current (injected current) of the LD 127 through a D/A 137. The predetermined gain of the EDF 115 is designated by the control circuit 145.

Moreover, an automatic level controller (hereinafter abbreviated to "ALC") 142 decides output signal power of the WDM optical signal from the output signal power of the WDM optical signal which is inputted from the A/D 138. Further, the ALC 142 controls attenuation by adjusting attenuation of the VAT 109 through a D/A 139 to obtain a predetermined output signal power. The predetermined output signal power is designated by the control circuit 145.

Further, the other WDM optical signal which is divided in the CPL 116 is made incident on a WDM coupler 117.

Meanwhile, laser light with the wavelength of the aforesaid OSC is oscillated from an LD 151. The oscillated laser light is made incident on a fiber bragg grating filter (hereinafter abbreviated to "FBG") 152 whose center wavelength of a reflection wavelength band is set to the wavelength of the OSC, at a low reflectance of 10% or lower. Thus, when a part of the laser light is returned to the LD 151 by the FBG 152, mode hopping which occurs in the LD 151 can be prevented, and hence the oscillation from the LD 151 becomes stable with the set oscillation wavelength.

The laser light from the FBG 152 is made incident on an optical modulator (hereinafter abbreviated to "MOD") 153.

The control circuit 145 adds new information about this repeater station to the information of the OSC which is received from the repeater station on the preceding stage, modulates the laser light according to the renewed information in the MOD 153, and generates a renewed OSC.

The OSC from the MOD 153 is made incident on the WDM coupler 117 and combined with the WDM optical signal from the aforesaid CPL 116, and outputted to the optical transmission line 62 to be transmitted to the repeater station 63 on the next stage or the optical receiving station 64.

Moreover, in a memory 146, frequency intervals $\Delta f$ and wavelength intervals $\Delta \lambda$ of the respective optical signals of the WDM optical signal, a loss coefficient of the loss as a function of wavelength of the optical transmission line 62 ($dTfib/d\lambda$), a peak gain coefficient $\gamma p$, an effective core cross-sectional area of the optical transmission line 62 and the like are stored. Further, in the memory 146, a relationship between gain sums of the EDFs 105, 115 and inclinations of the gain sums ($dG/d\lambda$) is stored. As to the relationship between the gain sums and the inclinations, for example, it is suitable to store a table in which the gain sums with intervals of 0.1 dB respectively correspond to the inclinations. Further, the memory 146 outputs these stored contents to the control circuit 145, receives the value calculated in the control circuit 145, the information of the OSC, the respective outputs from the PDs 122, 124, 126, 128, the gains of the AGCs 141, 143, the target value of the ALC 142 and the like from the control circuit 145, stores these, and outputs the stored contents to the control circuit 145 again.

The structure of the optical amplifying apparatus 90 in the optical transmitting station 61 is the structure of the above-described optical amplifying apparatus 91 without the WDM coupler 101, the FIL 121, the PD 129 and the A/D 131, because it is in the optical amplifying apparatus 90 that the OSC is generated for the first time.

Further, the structure of the optical amplifying apparatus 92 in the optical receiving station 64 is the structure of the above-described optical amplifying apparatus 91 without the LD 151, the FBG 152, the MOD 153 and the WDM coupler 117, because it is not necessary to renew and transmit the OSC.

Operation and Effects of the Third Embodiment

Hereinafter, the operation and effects of the optical communication system according to the third embodiment will be explained.

Incidentally, in the following explanation of the operation and effects, "s" is added to the numerals for respective optical components of the optical amplifying apparatus 90 in the optical transmitting station 61, "rp" is added to the numerals for respective optical components of the optical amplifying apparatus 91 in the repeater station 63, and "r" is added to the numerals for respective optical components of the optical amplifying apparatus 92 in the optical receiving station 64 in order to distinguish the components. For example, a control circuit 145s is of the optical amplifying apparatus 90, a control circuit 145rp is of the optical amplifying apparatus 91, and a control circuit 145r is of the optical amplifying apparatus 92.

In the optical transmitting station 61, the control circuit 145s uses the wavelengths of the respective channels which are stored in a memory 146s and calculates an interval between the channel in the longest wavelength side and the channel in the shortest wavelength side by subtracting the wavelength of the channel with the shortest wavelength from the wavelength of the channel with the longest wavelength. Namely, the control circuit 145s calculates a denominator of (formula 10). For example, when the WDM optical signal with all the 32 waves being multiplexed therein is transmitted, the control circuit 145s subtracts the wavelength of the channel 1 from the wavelength of the channel 32, that is, calculates $\lambda(32)-\lambda(1)$.

The control circuit 145s calculates a correction amount SL of the optical amplifying apparatus 90 with using (formula 1) and (formula 5) to (formula 10), by the aforesaid calculated value, the multiplex number (channel number) of the WDM optical signal, the length of the optical transmission line 62-1 between the optical transmitting station 61 and a repeater station 63-1 on the next stage and signal powers of the respective channels outputted from the optical transmitting station 61.

Here, the multiplex number, the length and the signal powers of the respective channels are set in the memory 146 when the optical transmitting station 61 is installed in the optical communication system. Especially, the signal powers of the respective channels are set to such values that a nonlinear optical effect is not caused in the optical transmission line 62 and these can be transmitted properly to the repeater station 63-1 on the next stage.

The control circuit 145s outputs target values to an ALC 142s so that the set signal powers of the respective channels are obtained. The ALC 142s adjusts attenuation of a VAT 109s while referring to an output from a PD 128s.

Further, the control circuit 145s determines the gain sum of an EDF 105s and an EDF 115s which corresponds to the correction amount SL (inclination), and adjusts the EDF 105s and the EDF 115s to obtain the gain sum. As to the adjustment of the EDF 105s and the EDF 115s, the gain sum is distributed to the EDF 105s and the EDF 115s at a ratio of 2:1.

Incidentally, when the gain sum is stored in a memory 146rp as the table of relationship between the gain sum and the inclination, it is suitable to search it from the table.

Moreover, the distribution ratio of the gain sum is not limited to 2:1 and it may be arbitrary such as 1:1 and 3:1. Further, the EDF 105s and the EDF 115s may be adjusted such that the gain of the EDF 105s is kept at a fixed value and the gain of the EDF 115s is set to a value obtained by subtracting the gain of the EDF 105s from the gain sum to be set. This also applies to control circuits 145rp, 145r which will be described later.

Furthermore, the control circuit 145s designates the gain of the EDF 105s to an AGC 141s. Referring to outputs from PDs 122s, 124s, the AGC 141s controls the amount of a drive current (injected current) of an LD 123s to obtain the designated gain. For this reason, the gain of the EDF 105s is maintained almost constant.

The control circuit 145s designates the gain of the EDF 115s to an AGC 143s. Referring to outputs from PDs 126s, 128s, the AGC 143s controls the amount of a drive current (injected current) of an LD 127s to obtain the designated gain. For this reason, the gain of the EDF 115s is maintained almost constant.

Therefore, in the optical amplifying apparatus 90, the gains of the EDFs 105s, 115s are maintained almost constant by the AGCs 141s, 143s, and the gain sum is also maintained to the predetermined value, and hence it is possible to allow the gain as a function of wavelength of the optical amplifying apparatus 90 to be the compensation amount SL.

For this reason, when the WDM optical signal whose channels have uniform signal powers as shown in the first from the left in the upper row of FIG. 5B is amplified in the optical amplifying apparatus 90, it becomes the WDM optical signal whose compensation amount SL is tilted as shown in the first from the left in the lower row of FIG. 5B.

The optical SNRs of the respective channels of this tilted WDM optical signal become almost the same in the incident side of the repeater station 63-1 on the next stage, as shown in the second from the left in the upper row of FIG. 5B.

Here, an example of the gain G and the inclination (dG/dλ) of the EDFs 105s, 115s will be explained.

By using an EDF which is heavily doped with alumina (dialuminum trioxide; $Al_2O_3$) as the EDFs 105s, 115s, the gain as a function of wavelengths of the EDFs 105s, 115s can be made almost linearly in an amplification band near 1550 nm. Further, in the amplification band near 1550 nm, the gain in the short wavelength side becomes high and the gain in the long wavelength side becomes low when an excitation rate is high, and the gain in the short wavelength side becomes low and the gain in the long wavelength side becomes high when the excitation rate is low.

By using the above EDFs 105s, 115s, the various inclinations can be made according to the excitation rates, and hence the gain as a function of wavelength of the optical amplifying apparatus 90 is allowed to be the same with the compensation amount SL while setting the sum of the gain of the EDF 105s and the gain of the EDF 115s to the gain of the optical amplifying apparatus 90.

Incidentally, as a gain as a function of wavelength of an erbium-doped optical fiber amplifier is generally nonlinear, it is possible to allow the gain as a function of wavelength of the optical amplifying apparatus 90 to be nonlinear.

Meanwhile, as to the OSC, laser light from an LD 151s is modulated in an MOD 153s according to information such as a multiplex number, a channel number with the shortest wavelength, a channel number with the longest wavelength, maintenance information which is necessary for operating the optical communication system and the like, and the laser light is combined with the WDM optical signal in a WDM coupler 117s and transmitted to the repeater station 63-1 on the next stage.

In the repeater station 63-1 which received the WDM optical signal as shown in the second from the left in the upper row of FIG. 5B, the control circuit 145$rp$ decides the channel number with the shortest wavelength and the channel number with the longest wavelength from the OSC received in the PD 129.

The control circuit 145$rp$ uses the wavelengths of the respective channels which are stored in the memory 146$rp$ and calculates an interval between the channel in the longest wavelength side and the channel in the shortest wavelength side by subtracting the wavelength of the channel with the shortest wavelength from the wavelength of the channel with the longest wavelength. Namely, the control circuit 145$rp$ calculates a denominator of the (formula 10).

The control circuit 145$rp$ calculates a correction amount SL of the optical amplifying apparatus 91 with using the (formula 1) and (formula 5) to (formula 10), by the aforesaid calculated value, the multiplex number (channel number) obtained from the OSC, the length of an optical transmission line 62-2 between the repeater station 63-1 and a repeater station 63-2 on the next stage and signal powers of the respective channels outputted from the repeater station 63-1.

Here, the length and the signal powers of the respective channels are set in the memory 146 when the repeater station 62-1 is installed in the optical communication system. Especially, the signal powers of the respective channels are set to such values that the nonlinear optical effect is not caused in the optical transmission line 62 and these can be transmitted properly to the repeater station 63-2 on the next stage.

The control circuit 145$rp$ outputs target values to an ALC 142$rp$ so that the set signal powers of the respective channels are obtained. The ALC 142$rp$ adjusts attenuation of a VAT 109$rp$ while referring to an output from a PD 128$rp$.

Further, the control circuit 145$rp$ determines the gain sum of an EDF 105$rp$ and an EDF 115$rp$ which corresponds to the correction amount SL (inclination), and adjusts the EDF 105$rp$ and the EDF 115$rp$ to obtain the gain sum. As to the adjustment of the EDF 105$rp$ and the EDF 115$rp$, the gain sum is distributed to the EDF 105$rp$ and the EDF 115$rp$ at a ratio of 2:1.

Furthermore, the control circuit 145$rp$ designates the gain of the EDF 105$rp$ to an AGC 141$rp$. Referring to outputs from PDs 122$rp$, 124$rp$, the AGC 141$rp$ controls the amount of a drive current of an LD 123$rp$ to obtain the designated gain. For this reason, the gain of the EDF 105$rp$ is maintained almost constant.

The control circuit 145$rp$ designates the gain of the EDF 115$rp$ to an AGC 143$rp$. Referring to outputs from PDs 126$rp$, 128$rp$, the AGC 143$rp$ controls the amount of a drive current of an LD 127$rp$ to obtain the designated gain. For this reason, the gain of the EDF 115$rp$ is maintained almost constant.

Therefore, in the optical amplifying apparatus 91, the gains of the EDFs 105$rp$, 115$rp$ are maintained almost constant by the AGCs 141$rp$, 143$rp$, and the gain sum is also maintained at the predetermined value, and hence it is possible to allow the gain as a function of wavelength of the optical amplifying apparatus 91 to be the compensation amount SL.

For this reason, when the WDM optical signal whose channels have uniform signal powers as shown in the second from the left in the upper row of FIG. 5B is amplified in the optical amplifying apparatus 91, it becomes the WDM optical signal whose compensation amount SL is tilted as shown in the second from the left in the lower row of FIG. 5B.

The optical SNRs of the respective channels of this tilted WDM optical signal become almost the same in the incident side of the repeater station 63-2 on the next stage, as shown in the third from the left in the upper row of FIG. 5B.

Meanwhile, as to the OSC, laser light from an LD 151$rp$ is modulated in an MOD 153$rp$ according to information such as a multiplex number and maintenance information which is necessary for operating the optical communication system and the like, the laser light is combined with the WDM optical signal in a WDM coupler 117$rp$ and transmitted to the repeater station 63-2 on the next stage.

The respective repeater stations 63 operate similarly to the repeater station 63-1 to transmit the WDM optical signal in sequence. On this occasion, the WDM optical signal is allowed to have wavelength dependency so that it becomes the compensation amount SL in the optical amplifying apparatus 91 in the repeater station 63 on the preceding stage, and hence the optical SNRs of the respective channels become almost the same in the incident side of the repeater station 63 on the next stage, as shown in the upper row of FIG. 5B.

In the optical receiving station 64 which received the WDM optical signal as shown in the first from the right in the upper row of FIG. 5B, the control circuit 145$r$ outputs target values to an ALC 142$r$ so that the signal powers of the respective channels which are stored in a memory 146$r$ are obtained. The ALC 142$r$ adjusts attenuation of a VAT 109$r$ while referring to an output from a PD 128$r$.

Further, the control circuit 145$r$ determines the gain sum of an EDF 105$r$ and an EDF 115$r$ which corresponds to a correction amount SL (inclination), and adjusts the EDF 105$r$ and the EDF 115$r$ to obtain the gain sum. As to the adjustment of the EDF 105$r$ and the EDF 115$r$, the gain sum is distributed to the EDF 105$r$ and the EDF 115$r$ at a ratio of 2:1.

Furthermore, the control circuit 145$r$ designates the gain of the EDF 105$r$ to an AGC 141$r$. Referring to outputs from PDs 122$r$, 124$r$, the AGC 141$r$ controls the amount of a drive current of an LD 123$r$ to obtain the designated gain. For this reason, the gain of the EDF 105$r$ is maintained almost constant.

The control circuit 145$r$ designates the gain of the EDF 115$r$ to an AGC 143$r$. Referring to outputs from PDs 126$r$, 128$r$, the AGC 143$r$ controls the amount of a drive current of an LD 127$r$ to obtain the designated gain. For this reason, the gain of the EDF 115$r$ is maintained almost constant.

Therefore, the optical SNRs of the respective channels become almost the same as shown in the first from the right in the lower row of FIG. 5B.

Then, the WDM optical signal is demultiplexed in the DEMUX 77 by each channel and received and processed in the ORs 78, respectively.

FIG. 5C shows the case in which an optical amplifying apparatus which does not compensate the transmission loss and the stimulated Raman scattering occurring in the optical transmission line 62 is used as the repeater station, for the comparison with the effects of the third embodiment.

As shown in FIG. 5C, wavelength characteristics accumulate due to the transmission loss and the stimulated Raman scattering in the optical transmission line 62 as the WDM optical signal transmits through the optical transmission line 62, and hence the optical SNRs of the respective channels become nonuniform.

For the clearer explanation thereof, FIG. 7 shows the level diagram and the optical SNR in the case of the six repeater stations. For the comparison, FIG. 8 shows the level diagram and the optical SNR when there are six repeater stations using the optical amplifying apparatus which does not compensate the transmission loss and the stimulated Raman scattering occurring in the optical transmission line 62.

As shown in FIG. 7A, in the third embodiment, signal powers of the respective channels are almost the same in the respective repeater stations 63. Further, as shown in FIG. 7B, the optical SNRs (OSNR) of the respective channels are almost the same in the optical transmitting station 61, the respective repeater stations 63 and the optical receiving station 64.

Meanwhile, in the optical communication system with the repeater stations using the optical amplifying apparatus which does not compensate the transmission loss and the stimulated Raman scattering as shown in FIG. 8A, signal power of a channel 1 which is the channel in the shortest wavelength side decreases gradually and signal power of the channel 32 which is a channel in the longest wavelength side increases gradually as these transmit. Further, as shown in FIG. 8B, an optical SNR of the channel 1 which is the channel in the shortest wavelength side degrades more than an optical SNR of the channel 32 in the longest wavelength side, as being transmitted through the optical transmitting station 61, the respective repeater stations 63 and the optical receiving station 64.

Thus, the transmission loss and the stimulated Raman scattering which occur in the optical transmission line 62 are compensated by the compensation amount SL to improve the optical SNR, repetition intervals can be lengthened. Also, an interval between the optical transmitting station 61 and the optical receiving station 64 can be lengthened.

Incidentally, in the third embodiment, the OSC is generated by the laser light from the LD 151 being modulated in the MOD 153 which is an external optical modulator, but it can be generated by directly modulating the LD 151.

Next, another embodiment will be explained.
Structure of a Fourth Embodiment

The fourth embodiment is an embodiment of an optical communication system according to the present invention. In the optical communication system of the fourth embodiment, a 32-wave WDM optical signal is transmitted between two terminal stations while being amplified in sequence by a plurality of optical amplifying apparatuses according to the present invention.

The third embodiment is the embodiment of the optical amplifying apparatus in which the loss as a function of wavelength of the optical transmission line is compensated in advance when the WDM optical signal is transmitted to the repeater station on the next stage, but the fourth embodiment is the embodiment of the optical amplifying apparatus in which a WDM optical signal which is transmitted from a repeater station on a preceding stage to be made incident thereon is compensated by loss as a function of wavelength of an optical transmission line through which the WDM optical signal is transmitted.

Figure 9:
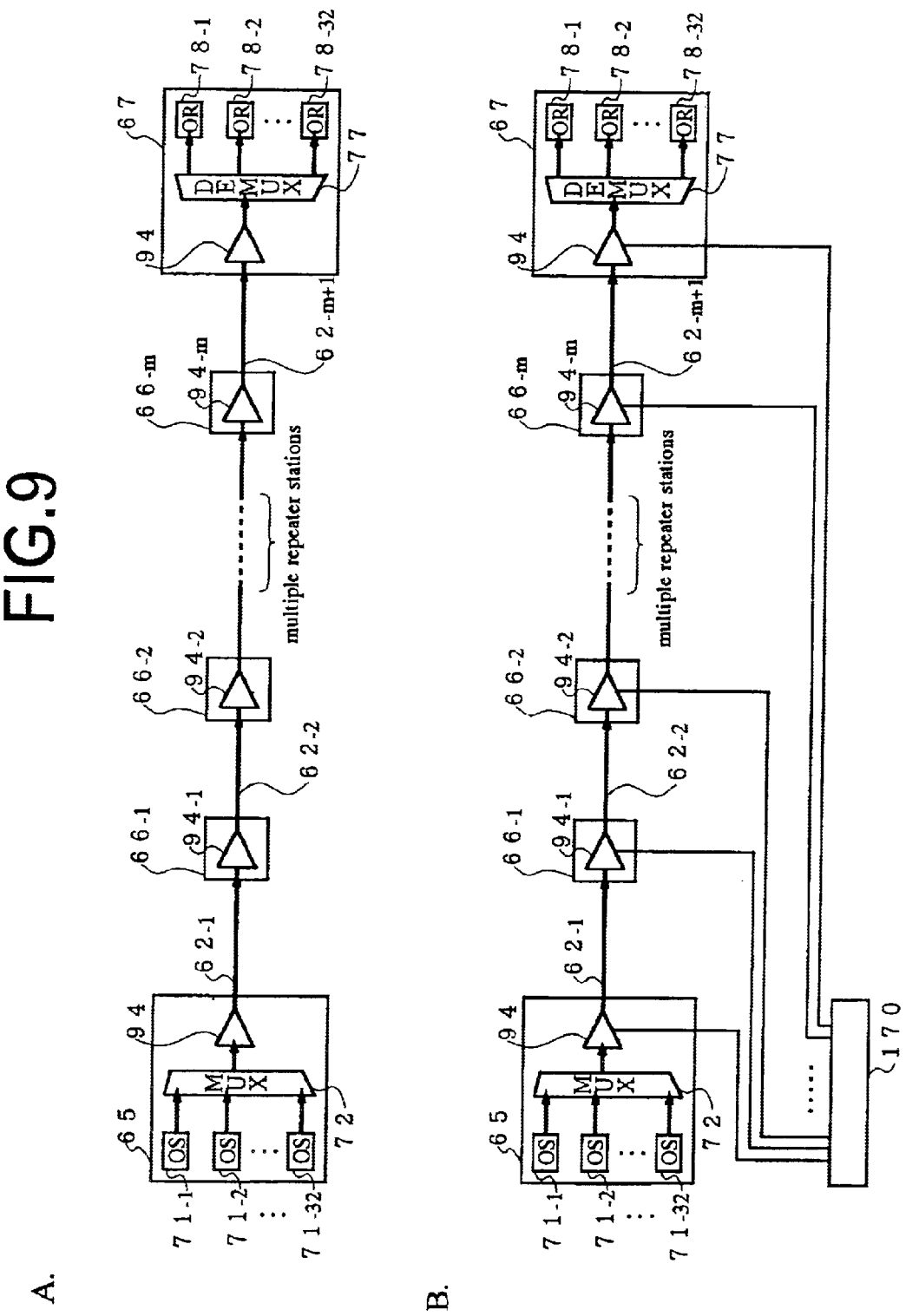
FIG. 9 show the structure of an optical communication system according to a fourth embodiment.

FIGS. 9A and 9B are views showing the structure of the optical communication system according to the fourth embodiment.

Figure 10:
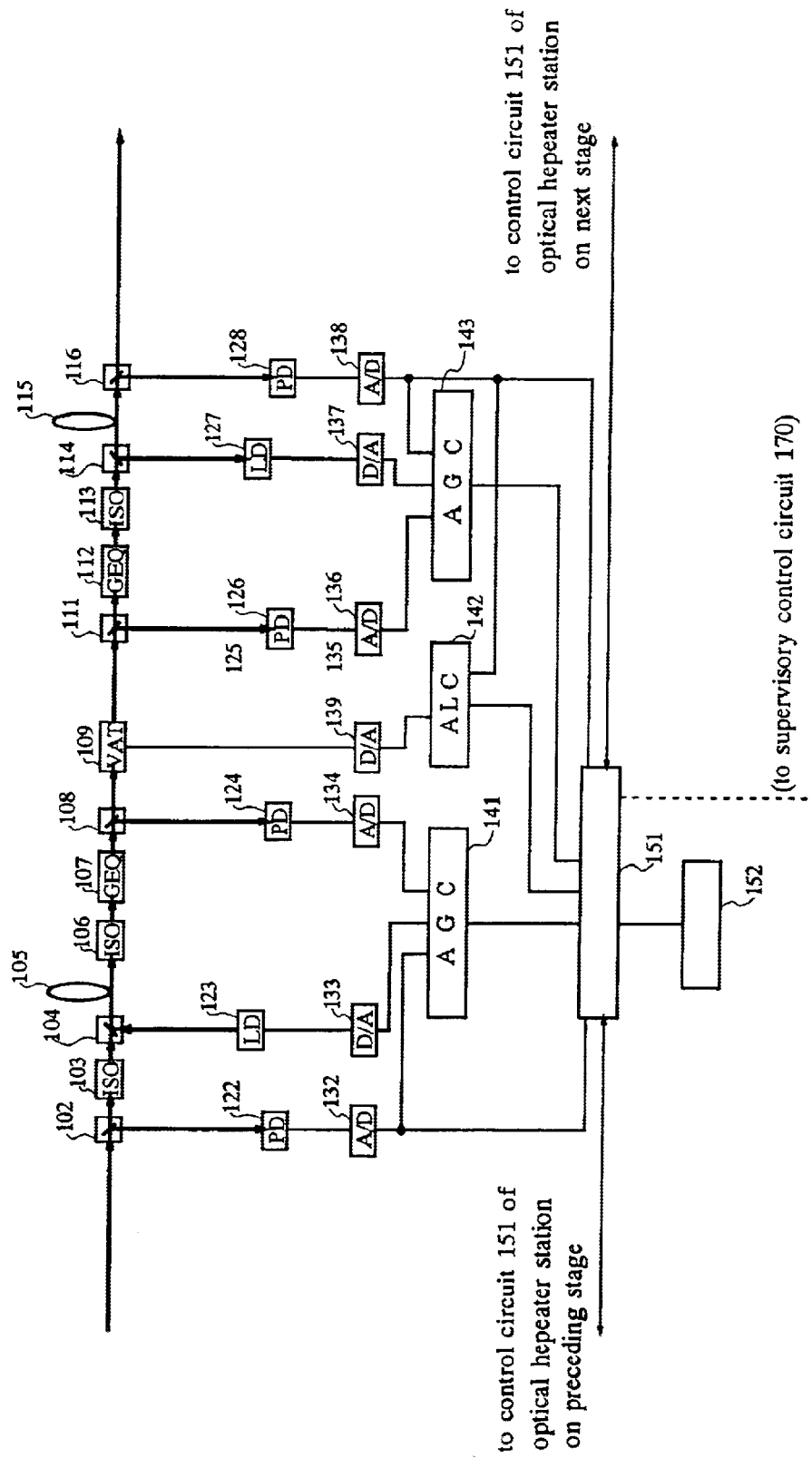
FIG. 10 shows the structure of an optical amplifying apparatus in the optical communication system according to the fourth embodiment.

FIG. 10 is a view showing the structure of the optical amplifying apparatus in the optical communication system according to the fourth embodiment.

First, the structure of the optical communication system as shown in FIG. 9A will be explained.

As in FIG. 9A, the optical communication system according to the fourth embodiment includes an optical transmitting station 65 which generates the WDM optical signal and sends it out, an optical transmission line 62, and an optical receiving station 67 which receives the transmitted WDM optical signal. Further, a plurality of repeater stations 66 each of which includes an optical amplifying apparatus 94 provided at some midpoints in the optical transmission line 62.

In the optical transmitting station 65, a plurality of optical signals from OSs 71 are wavelength-multiplexed in an MUX 72 and the WDM optical signal is generated. The generated WDM optical signal is amplified by the optical amplifying apparatus 94 in the optical transmitting station 65 and is outputted to the optical transmission line 62.

In the repeater station 66, the WDM optical signal which is transmitted from the optical transmitting station 65 or the repeater station 66 on its preceding stage through the optical transmission line 62 is amplified by the optical amplifying apparatus 94 to be outputted to the optical transmission line 62 so that the WDM optical signal is transmitted to the repeater station 66 on the next stage or the optical receiving station 67.

In the optical receiving station 67, the WDM optical signal from a repeater station m66-m on the preceding stage is amplified in the optical amplifying apparatus 94 and the wavelength of the amplified WDM optical signal is demultiplexed in a DEMUX 77. Further, thus-demultiplexed optical signals are respectively demodulated in ORs 78-1 to 78-32 and information is taken out therefrom.

Next, the structure of the optical amplifying apparatus 94 which is used in the optical transmitting station 65, the repeater stations 66 and the optical receiving station 67 will be explained.

As in FIG. 10, the WDM optical signal from the MUX 72 or the repeater station 66 on the preceding stage is made incident on a CPL 102 in the optical amplifying apparatus 94.

The WDM optical signal is divided in the CPL 102, and one of these is made incident on a PD 122 to be subjected to a photoelectric conversion. An output from the PD 122 is inputted into a control circuit 151 and an AGC 141 through an A/D 132.

Further, the other WDM optical signal which is divided in the CPL 102 is made incident on a CPL 104 through an ISO 103.

Moreover, laser light from an LD 123 from which pump light to excite an EDF 105 is oscillated is made incident on the CPL 104 to be multiplexed therein with the WDM optical signal from the aforesaid ISO 103. The combined laser light and WDM optical signal are made incident on the EDF 105. The WDM optical signal which is amplified in the EDF 105 is made incident on a CPL 108 through an ISO 106 and a GEQ 107.

The WDM optical signal is divided in the CPL 108, and one of these is made incident on a PD 124 to be subjected to the photoelectric conversion. An output from the PD 124 is inputted into the AGC 141 through an A/D 134. According to the outputs from the aforesaid A/D 132 and the A/D 134, the AGC 141 controls a gain of the EDF 105 to a predetermined gain which is designated by the control circuit 151.

Further, the other WDM optical signal which is divided in the CPL 108 is made incident on a VAT 109 whose attenuation is controlled by a signal inputted from an ALC 142 through a D/A 139. The WDM optical signal from the VAT 109 is made incident on a CPL 111.

The WDM optical signal is divided in the CPL 11, and one of these is made incident on a PD 126 to be subjected to the photoelectric conversion. An output from the PD 126 is inputted into an AGC 143 through an A/D 136. The other WDM optical signal which is divided in the CPL 111 is made incident on a CPL 114 through a GEQ 112 and an ISO 113.

Laser light from an LD 127 from which pump light to excite an EDF 115 is oscillated is made incident on the CPL 114 to be multiplexed therein with the WDM optical signal from the aforesaid ISO 113. The combined laser light and WDM optical signal are made incident on the EDF 115, and the WDM optical signal which is amplified in the EDF 115 is made incident on a CPL 116.

The WDM optical signal is divided in the CPL 116, and one of these is made incident on a PD 128 to be subjected to the photoelectric conversion. An output from the PD 128 is inputted into the AGC 143, the ALC 142 and the control circuit 151 through an A/D 138.

According to the outputs from the aforesaid A/D 136 and the A/D 138, the AGC 143 measures a gain of the EDF 115 and controls the gain of the EDF 115 to a predetermined gain which is designated by the control circuit 151.

Determining output signal power of the WDM optical signal from the output of the A/D 138, the ALC 142 controls the attenuation of the VAT 109 to predetermined output signal power which is designated by the control circuit 151.

Further, the other WDM optical signal which is divided in the CPL 108 is made incident on the CPL 111. The other WDM signal which is divided in the CPL 116 is outputted to the optical transmission line 62 to be transmitted to the repeater station 66 on the next stage or the optical receiving station 67.

The control circuit 151 transmits, to the control circuit 151 in the optical transmitting station 65 on the preceding stage or the control circuit 151 in the repeater station 66 on the preceding stage, maintenance information and status information necessary for the operation of the optical communication system, such as mean input signal power of the WDM optical signal input to the repeater station 66, as a supervisory signal. The mean input power is obtained from the A/D 132. Further, the control circuit 151 receives the supervisory signal which includes information such as the mean input signal power of the WDM optical signal input to the optical receiving station 67 on the next stage or the repeater station 66 on the next stage, from the control circuit 151 in the receiving station 67 on the next stage or the control circuit 151 in the repeater station 66 on the next stage.

Moreover, in a memory 152, frequency intervals Δf and wavelength intervals Δλ of the respective optical signals of the WDM optical signal, a loss coefficient of the loss as a function of wavelength of the optical transmission line 62 (dTfib/dλ), a peak gain coefficient γp, an effective core cross-sectional area of the optical transmission line 62 Aeff and the like are stored. Further, in the memory 152, a relationship between gain sums of the EDFs 105, 115 and inclinations of the gain sums (dG/dλ), and output signal power when the WDM optical signal is outputted from the optical amplifying apparatus 94 to the optical transmission line 62 are stored. Further, the memory 152 outputs these stored contents to the control circuit 151, receives the value calculated in the control circuit 151, the respective outputs from the PDs 122, 124, 126, 128, the gains of the AGCs 141, 143, the target value of the ALC 142 and the like from the control circuit 151, stores these, and outputs the stored contents to the control circuit 151 again.

Operation and Effects of the Fourth Embodiment

Next, the operation and effects of the optical communication system according to the fourth embodiment will be explained.

The WDM optical signal which is generated in the optical transmitting station 65 is made incident on the optical amplifying apparatus 94 in the optical transmitting station 65.

In the optical amplifying apparatus 94 in the optical transmitting station 65, a control circuit 151s outputs target values to an ALC 142s so that the signal powers of the respective channels which are stored in a memory 152s are obtained. The ALC 142s adjusts attenuation of a VAT 109s while referring to an output from a PD 128s.

Further, the control circuit 151s determines the gain sum of an EDF 105s and an EDF 115s so that the almost flattened inclination is obtained, and distributes the gain sum to the EDF 105s and the EDF 115s.

Furthermore, the control circuit 151s designates the gain of the EDF 105s to an AGC 141s. Referring to outputs from PDs 122s, 124s, the AGC 141s controls the amount of a drive current of an LD 123s to obtain the designated gain. For this reason, the gain of the EDF 105s is maintained almost constant.

The control circuit 151s designates the gain of the EDF 115s to an AGC 143s. Referring to outputs from PDs 126s, 128s, the AGC 143s controls the amount of a drive current of an LD 127s to obtain the designated gain. For this reason, the gain of the EDF 115s is maintained almost constant.

Moreover, the control circuit 151s transmits information about the mean signal power of the WDM optical signal which is obtained from the PD 128s, a channel number with the shortest wavelength, a channel number with the longest wavelength and a multiplex number, together with the maintenance information or the like which is necessary for operating the optical communication system, to a control circuit 151rp in a repeater station 66-1 on the next stage, by using a dedicated line.

Being thus controlled, the WDM optical signal outputted from the optical transmitting station 65 becomes the WDM optical signal whose channels have almost the same signal powers to be outputted to an optical transmission line 62-1.

The signal powers of the respective channels of the WDM optical signal become nonuniform due to transmission loss and a stimulated Raman scattering in the optical transmission line 62-1. Therefore, the WDM optical signal with an inclination is made incident on the repeater station 66-1.

In the repeater station 66-1 which received the WDM optical signal with the inclination, the control circuit 151rp decides the channel number with the shortest wavelength and the channel number with the longest wavelength from the signal which is received in the dedicated line.

The control circuit 151rp uses the wavelengths of the respective channels which are stored in a memory 152rp and calculates a denominator of (formula 10) by subtracting the wavelength of the channel with the shortest wavelength from the wavelength of the channel with the longest wavelength.

Further, the control circuit 151rp receives from a PD 122rp mean signal power of the WDM optical signal which is made incident on the repeater station 66-1. The control circuit 151rp calculates a difference between the information of the mean signal power of the WDM optical signal outputted from the optical transmitting station 65 which is obtained from the signal received in the dedicated line and the mean signal power of the WDM optical signal from the PD 122rp. Then, by dividing the difference by a loss coefficient of the optical transmission line 62-1, the control circuit 151rp determines the length of the optical transmission line 62-1.

The control circuit 151rp calculates a correction amount SL of the optical amplifying apparatus 94 in the repeater station 66 with using the (formula 1) and (formula 5) to (formula 10), by the calculated value of the denominator of the (formula 10), the multiplex number (channel number) obtained from the received signal, the determined length of an optical transmission line 62-2 and signal powers of the respective channels outputted from the repeater station 66-1.

Here, the signal powers of the respective channels are set in the memory 152rp when the repeater station 62-1 is installed in the optical communication system.

The control circuit 151rp outputs target values to an ALC 142rp so that the set signal powers of the respective channels are obtained. The ALC 142rp adjusts attenuation of a VAT 109rp while referring to an output from a PD 128rp.

Further, the control circuit 151rp determines the gain sum of an EDF 105rp and an EDF 115rp which corresponds to the correction amount SL (inclination), and adjusts the EDF 105rp and the EDF 115rp to obtain the gain sum. As to the adjustment, for example, the gain sum is distributed to the EDF 105rp and the EDF 115rp at a ratio of 2:1.

Then, the control circuit 151rp designates the gain of the EDF 105rp to an AGC 141rp. Referring to outputs from PDs 122rp, 124rp, the AGC 141rp controls the amount of a drive current of an LD 123rp to obtain the designated gain. For this reason, the gain of the EDF 105rp is maintained almost constant.

Then, the control circuit 151rp designates the gain of the EDF 115rp to an AGC 143rp. Referring to outputs from PDs 126rp, 128rp, the AGC 143rp controls the amount of a drive current of an LD 127rp to obtain the designated gain. For this reason, the gain of the EDF 115rp is maintained almost constant.

Therefore, in the optical amplifying apparatus 94, the gains of the EDFs 105rp, 115rp are maintained almost constant by the AGCs 141rp, 143rp, and the gain sum is also maintained to the predetermined value, and hence the gain as a function of wavelength of the optical amplifying apparatus 94 can be equal to the compensation amount SL. For this reason, the optical SNRs of the respective channels of the WDM optical signal which is outputted from the optical amplifying apparatus 94 to the optical transmission line 62-2 become almost the same.

Moreover, the control circuit 151rp transmits information about the mean signal power of the WDM optical signal which is obtained from the PD 128rp, a channel number with the shortest wavelength, a channel number with the longest wavelength and a multiplex number, together with the maintenance information or the like which is necessary for operating the optical communication system, to the control circuit 151rp in the repeater station 66-2 on the next stage, by using the dedicated line.

The signal powers of the respective channels of the WDM optical signal become nonuniform due to the transmission loss and the stimulated Raman scattering in the optical transmission line 62-2. Therefore, the WDM optical signal with the inclination is made incident on the repeater station 66-2.

The respective repeater stations 66 operate similarly to the repeater station 66-1 to transmit the WDM optical signal in sequence. On this occasion, wavelength dependency of the WDM optical signal which occurs in the optical transmission line 62 due to the transmission loss and the stimulated Raman scattering is compensated in the optical amplifying apparatuses 94 in the respective repeater stations 66. Hence, the optical SNRs of the respective channels of the WDM optical signal which is outputted from the optical amplifying apparatus 94 to the optical transmission line 62 become almost the same.

In the repeater station 67 which received the WDM optical signal with the inclination, a control circuit 151r decides the channel number with the shortest wavelength and the channel number with the longest wavelength from the signal which is received in the dedicated line.

The control circuit 151r uses the wavelengths of the respective channels which are stored in a memory 152r and calculates the denominator of the (formula 10) by subtracting the wavelength of the channel with the shortest wavelength from the wavelength of the channel with the longest wavelength.

Further, the control circuit 151r receives from a PD 122r mean signal power of the WDM optical signal which is made incident on the optical receiving station 67. The control circuit 151r calculates a difference between the information of the mean signal power of the WDM optical signal outputted from the repeater station 66 on the preceding stage which is obtained from the signal received in the dedicated line and the mean signal power of the WDM optical signal from the PD 122r. Then, by dividing the difference by a loss coefficient of an optical transmission line 62-m+1, the control circuit 151r determines the length of the optical transmission line 62-m+1.

The control circuit 151r calculates the correction amount SL of the optical amplifying apparatus 94 with using the (formula 1) and (formula 5) to (formula 10), by the calculated value of the denominator of the (formula 10), the multiplex number obtained from the received signal, the determined length of an optical transmission line 62-2 and signal powers of the respective channels outputted from the optical amplifying apparatus 94 in the optical receiving station 67.

Here, the signal powers of the respective channels are set in the memory 152r when the optical receiving station 67 is installed in the optical communication system. Especially, the signal powers of the respective channels are set to such values that the optimal signal powers are made incident on the ORs 78, in consideration of the loss of the DEMUX 77.

The control circuit 151r outputs target values to an ALC 142r so that the set signal powers of the respective channels are obtained. The ALC 142r adjusts attenuation of a VAT 109r while referring to an output from a PD 128r.

Further, the control circuit 151r determines the gain sum of an EDF 105rp and an EDF 115r which corresponds to the correction amount SL (inclination), and adjusts the EDF 105r and the EDF 115r to obtain the gain sum. As to the adjustment, for example, the gain sum is distributed to the EDF 105r and the EDF 115r at a ratio of 2:1.

Then, the control circuit 151r designates the gain of the EDF 105r to an AGC 141r. Referring to outputs from PDs 122r, 124r, the AGC 141r controls the amount of a drive current of an LD 123r to obtain the designated gain. For this reason, the gain of the EDF 105r is maintained almost constant.

Then, the control circuit 151r designates the gain of the EDF 115r to an AGC 143r. Referring to outputs from PDs 126r, 128r, the AGC 143r controls the amount of a drive current of an LD 127r to obtain the designated gain. For this reason, the gain of the EDF 115r is maintained almost constant.

Therefore, in the optical amplifying apparatus 94, the gains of the EDFs 105r, 115r are maintained almost constant by the AGCs 141r, 143r, and the gain sum is also maintained to the predetermined value, and hence the gain as a function of wavelength of the optical amplifying apparatus 94 can be equal to the compensation amount SL. For this reason, the optical SNRs of the respective channels of the WDM optical signal which is outputted from the optical amplifying apparatus 94 to the DEMUX 77 become almost the same.

Thus, the transmission loss and the stimulated Raman scattering which occur in the optical transmission line 62 are compensated by the compensation amount SL to improve the optical SNRs, repetition intervals can be lengthened. Also, an interval between the optical transmitting station 65 and the optical receiving station 67 can be lengthened.

Incidentally, in the fourth embodiment, the compensation amount SL is calculated by the control circuits 151*rp* in the respective repeater stations 66 and the control circuit 151*r* in the optical receiving station 67, but, as shown in FIG. 9B, the mean signal power of the WDM optical signal being outputted from the optical transmitting station 65, the mean signal power of the WDM optical signal being made incident on the respective repeater stations 66, the mean signal power of the WDM optical signal being outputted from the respective repeater station 66, the mean signal power of the WDM optical signal being made incident on the optical receiving station 67 and the multiplex number which are necessary for calculating the lengths of the respective optical transmission lines 62 may be concentrated on a supervisory control circuit 170 which manages the overall optical communication system from the control circuit 151*s* in the optical transmitting station 65, the control circuits 151*rp* in the respective repeater stations 66 and the control circuit 151*r* in the optical receiving station 67, and the compensation amount of the respective repeater stations 66 and the optical receiving station 67 may be calculated in the supervisory control circuit 170 to transmit its result to the respective repeater stations 66 and the optical receiving station 67.

Next, another embodiment will be explained.
Structure of a Fifth Embodiment

The fifth embodiment is an embodiment of an optical communication system according to the present invention. In the optical communication system of the fifth embodiment, a 32-wave WDM optical signal is transmitted between two terminal stations while being amplified in sequence by a plurality of optical amplifying apparatuses according to the present invention.

The fifth embodiment is the embodiment in which a spectrum of the WDM optical tis signal transmitting through an optical transmission line is measured so that loss as a function of wavelength of the optical transmission line is measured to compensate the loss as a function of wavelength.

FIGS. 11A and 11B are views showing the structure of the optical communication system according to the fifth embodiment.

Figure 12:
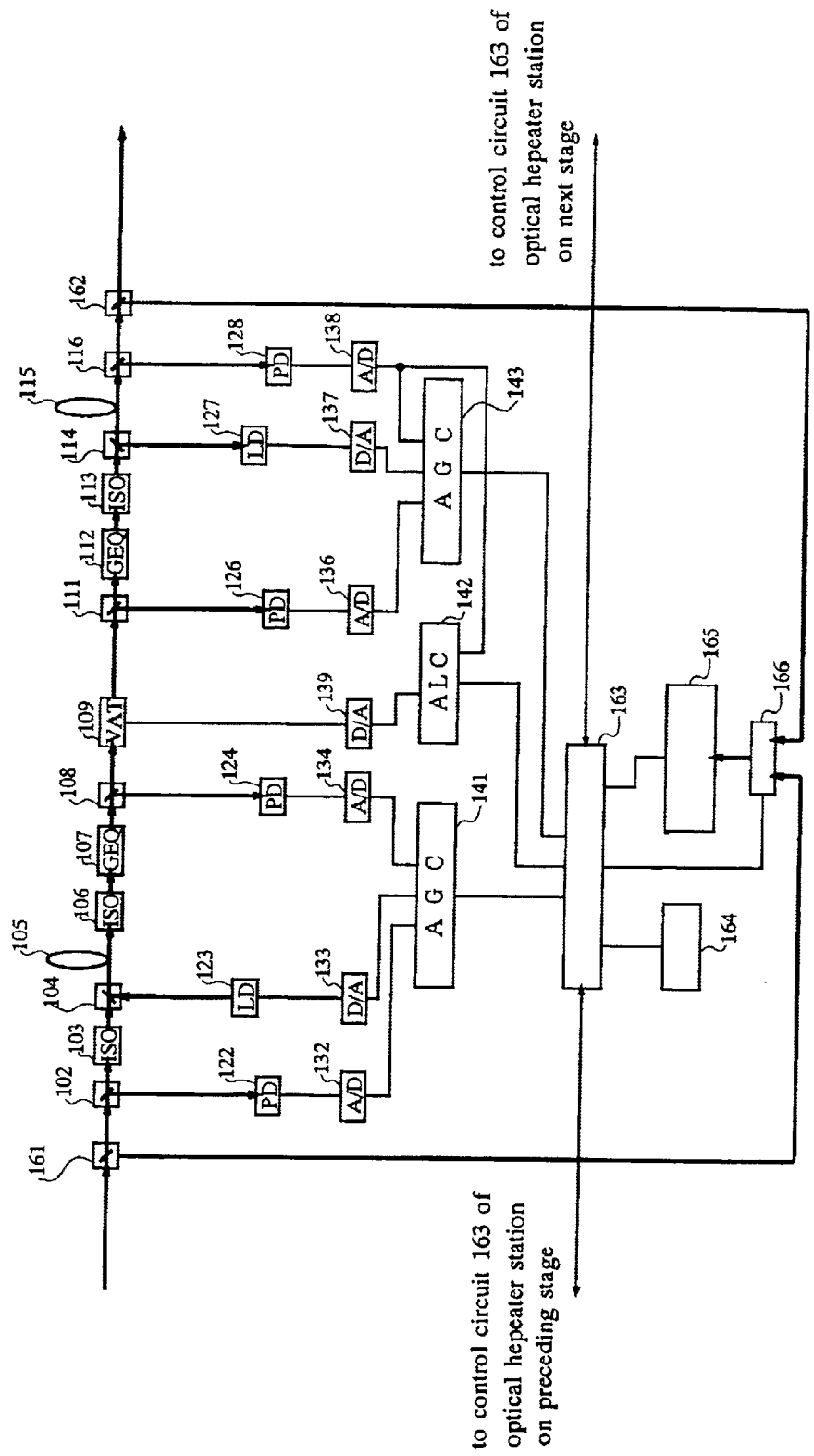
FIG. 12 shows the structure of an optical amplifying apparatus in the optical communication system according to the fifth embodiment.

FIG. 12 is a view showing the structure of the optical amplifying apparatus in the optical communication system according to the fifth embodiment.

Incidentally, in FIGS. 11A and 11B, the same numerals are given to the same structures with the third embodiment, and explanations thereof are omitted.

First, the structure of the optical communication system as shown in FIG. 11A will be explained.

As in FIG. 11A, the optical communication system according to the fifth embodiment includes an optical transmitting station 68 which generates the WDM optical signal and sends it out, an optical transmission line 62, and an optical receiving station 70 which receives the transmitted WDM optical signal. Further, a plurality of repeater stations 69 having an optical amplifying apparatus 97 are provided at some midpoints in the optical transmission line 62.

In the optical transmitting station 68, a plurality of optical signals from OSs 71 are wavelength-multiplexed in an MUX 72 and the WDM optical signal is generated. The generated WDM optical signal is amplified by the optical amplifying apparatus 97 in the optical transmitting station 68 and is outputted to the optical transmission line 62.

In the repeater station 69, the WDM optical signal which is transmitted from the optical transmitting station 68 or the repeater station 69 on its preceding stage through the optical transmission line 62 is amplified by the optical amplifying apparatus 97 to be outputted to the optical transmission line 62 so that the WDM optical signal is transmitted to the repeater station 69 on the next stage or the optical receiving station 70.

In the optical receiving station 70, the WDM optical signal from a repeater station m69-m on the preceding stage is amplified in an optical amplifying apparatus 97 and the wavelength of the amplified WDM optical signal is demultiplexed in a DEMUX 77. Further, thus-demultiplexed optical signals are respectively demodulated in ORs 78-1 to 78-32 and information is taken out therefrom.

Next, the structure of the optical amplifying apparatus 97 which is used in the optical transmitting station 68, the repeater stations 69 and the optical receiving station 70 will be explained.

As in FIG. 12, the WDM optical signal from the MUX 72 or the repeater station 69 on the preceding stage is made incident on a CPL 161 in the optical amplifying apparatus 97.

The WDM optical signal is divided in the CPL 161, and one of these is made incident on an optical switch (hereinafter abbreviated to "optical SW") 166. Further, the other WDM optical signal which is divided in the CPL 161 is made incident on a CPL 102.

The WDM optical signal is divided in the CPL 102, and one of these is made incident on a PD 122 to be subjected to a photoelectric conversion. An output from the PD 122 is inputted into an AGC 141 through an A/D 132. The other WDM optical signal which is divided in the CPL 102 is made incident on a CPL 104 through an ISO 103.

Moreover, laser light from an LD 123 is made incident on the CPL 104 to be multiplexed therein with the WDM optical signal from the aforesaid ISO 103. The combined laser light and WDM optical signal is made incident on an EDF 105.

The WDM optical signal which is amplified in the EDF 105 is made incident on a CPL 108 through an ISO 106 and a GEQ 107.

The WDM optical signal is divided in the CPL 108, and one of these is made incident on a PD 124 to be subjected to the photoelectric conversion. An output from the PD 124 is inputted into the AGC 141 through an A/D 134. According to the outputs from the aforesaid A/D 132 and the A/D 134, the AGC 141 controls a gain of the EDF 105 to a predetermined gain which is designated by a control circuit 163.

Further, the other WDM optical signal which is divided in the CPL 108 is made incident on a VAT 109 whose attenuation is controlled by a signal inputted from an ALC 142 through a D/A 139. The WDM optical signal from the VAT 109 is made incident on a CPL 111.

The WDM optical signal is divided in the CPL 111, and one of these is made incident on a PD 126 to be subjected to the photoelectric conversion. An output from the PD 126 is inputted into an AGC 143 through an A/D 136. The other WDM optical signal which is divided in the CPL 111 is made incident on a CPL 114 through a GEQ 112 and an ISO 113.

Laser light from an LD 127 is made incident on the CPL 114 to be multiplexed therein with the WDM optical signal from the aforesaid ISO 113. The combined laser light and WDM optical signal are made incident on an EDF 115. The WDM optical signal which is amplified in the EDF 115 is made incident on a CPL 116.

The WDM optical signal is divided in the CPL 116, and one of these is made incident on a PD 128 to be subjected to the photoelectric conversion. An output from the PD 128 is inputted into the AGC 143, the ALC 142 and the control circuit 163 through an A/D 138.

According to the outputs from the aforesaid A/D 136 and the A/D 138, the AGC 143 measures a gain of the EDF 115 and controls the gain of the EDF 115 to a predetermined gain which is designated by the control circuit 163.

Determining output signal power of the WDM optical signal from the output from the A/D 138, the ALC 142 controls the attenuation of the VAT 109 to obtain predetermined output signal power which is designated by the control circuit 163.

Further, the other WDM optical signal which is divided in the CPL 116 is made incident on a CPL 162.

The WDM optical signal is divided in the CPL 162, and one of these is outputted to the optical transmission line 62 to be transmitted to the repeater station 66 on the next stage or the optical receiving station 67. The other WDM optical signal which is divided in the CPL 162 is made incident on the optical SW 166.

The optical SW 166 allows either the WDM optical signal from the aforesaid CPL 161 or the WDM optical signal from the CPL 162 to be made incident on a spectrum analyzer 165. The selection of either one of these is controlled by the control circuit 163.

The spectrum analyzer 165 measures a wavelength of the incident light (frequency) and signal power of the light with the wavelength and outputs the result to the control circuit 163. Information such as maintenance information and status information which is necessary for operating the optical communication system, for example, the spectrum of the WDM optical signal being made incident on the repeater station 69 which is obtained from the spectrum analyzer 165 is transmitted as a supervisory signal by the control circuit 163 to the control circuit 163 in the optical transmitting station 68 on the preceding stage or the control circuit 163 in the repeater station 69 on the preceding stage. Further, the control circuit 163 receives the supervisory signal which includes the spectrum or the like of the WDM optical signal being made incident on the optical receiving station 70 on the next stage or the repeater station 69 on the next stage, from the control circuit 163 in the optical receiving station 70 on the next stage or the control circuit 163 in the repeater station 69 on the next stage.

Moreover, in a memory 164, a relationship between gain sums of the EDFs 105, 115 and inclinations of the gain sums $(dG/d\lambda)$, output signal power when the WDM optical signal is outputted from the optical amplifying apparatus 97 to the optical transmission line 62 and the like are stored. Further, the memory 164 outputs these stored contents to the control circuit 163, receives the value calculated in the control circuit 163, the respective outputs from the PDs 122, 124, 126, 128, the output from the spectrum analyzer 165, the gains of the AGCs 141, 143, the target value of the ALC 142 and the like from the control circuit 163, stores these, and outputs the stored contents to the control circuit 163 again.

Operation and Effects of the Fifth Embodiment

Next, the operation and effects of the optical communication system according to the fifth embodiment will be explained.

The WDM optical signal which is generated in the optical transmitting station 68 is made incident on the optical amplifying apparatus 97 in the optical transmitting station 68.

In the optical amplifying apparatus 97 in the optical transmitting station 68, a control circuit 163s outputs target values to an ALC 142s so that the signal powers of the respective channels which are stored in a memory 164s are obtained. The ALC 142s adjusts attenuation of a VAT 109s while referring to an output from a PD 128s.

Further, the control circuit 163s determines the gain sum of an EDF 105s and an EDF 115s so that the almost flattened inclination is obtained, and distributes the gain sum to the EDF 105s and the EDF 115s.

Furthermore, the control circuit 163s designates the gain of the EDF 105s to an AGC 141s. Referring to outputs from PDs 122s, 124s, the AGC 141s controls the amount of a drive current of an LD 123s to obtain the designated gain. For this reason, the gain of the EDF 105s is maintained almost constant.

The control circuit 163s designates the gain of the EDF 115s to an AGC 143s. Referring to outputs from PDs 126s, 128s, the AGC 143s controls the amount of a drive current of an LD 127s to obtain the designated gain. For this reason, the gain of the EDF 115s is maintained almost constant.

Moreover, the control circuit 163s switches an optical SW 166s so that the WDM optical signal from a CPL 162s is made incident on a spectrum analyzer 165s. The control circuit 163s receives a measurement result from the spectrum analyzer 165s. The control circuit 163s transmits information about the spectrum of the WDM optical signal which is obtained from the spectrum analyzer 165s, a channel number with the shortest wavelength, a channel number with the longest wavelength and a multiplex number, together with the maintenance information or the like which is necessary for operating the optical communication system, to a control circuit 163rp in a repeater station 69-1 on the next stage, by using a dedicated line.

Being thus controlled, the WDM optical signal outputted from the optical transmitting station 68 becomes the WDM optical signal whose channels have almost the same signal powers to be outputted to an optical transmission line 62-1.

The signal powers of the respective channels of the WDM optical signal becomes nonuniform due to transmission loss and a stimulated Raman scattering in the optical transmission line 62-1. Therefore, the WDM optical signal with an inclination is made incident on the repeater station 69-1.

In the repeater station 69-1 which received the WDM optical signal with the inclination, the control circuit 163rp decides the channel number with the shortest wavelength and the channel number with the longest wavelength from the signal which is received in the dedicated line.

The control circuit 163rp uses the wavelengths of the respective channels which are stored in a memory 164rp and calculates a wavelength interval between the channel with the longest wavelength and the channel with the shortest wavelength by subtracting the wavelength of the channel with the shortest wavelength from the wavelength of the channel with the longest wavelength.

Further, the control circuit 163rp switches an optical SW 166rp so that the WDM optical signal from the CPL 161rp is made incident on a spectrum analyzer 165rp. The control circuit 163rp receives a measurement result from the spectrum analyzer 165rp.

Then, the control circuit 163rp calculates wavelength dependency (inclination) according to the measurement result from the spectrum analyzer 165rp and information about the spectrum of the WDM optical signal which is outputted from the optical transmitting station 68 obtained by the signal which is received in the dedicated line. This measurement result corresponds to the compensation amount SL.

Incidentally, the control circuit 163*rp* may determine the length of the optical transmission line 62-1 from these spectrums, and calculate the correction amount SL with using (formula 1) to (formula 4) and (formula 10) from these spectrums.

The control circuit 163*rp* outputs target values to an ALC 142*rp* so that the set signal powers of the respective channels are obtained. The ALC 142*rp* adjusts attenuation of a VAT 109*rp* while referring to an output from a PD 128*rp*.

Here, the signal powers of the respective channels as the target values of the ALC 142*rp* are set in the memory 164*rp* when the repeater station 69-1 is installed in the optical communication system.

Further, the control circuit 163*rp* determines the gain sum of an EDF 105*rp* and an EDF 115*rp* which corresponds to the correction amount SL (inclination), and adjusts the EDF 105*rp* and the EDF 115*rp* to obtain the gain sum. As to the adjustment, for example, the gain sum is distributed to the EDF 105*rp* and the EDF 115*rp* at a ratio of 2:1.

Then, the control circuit 163*rp* designates the gain of the EDF 105*rp* to an AGC 141*rp*. Referring to outputs from PDs 122*rp*, 124*rp*, the AGC 141*rp* controls the amount of a drive current of an LD 123*rp* to obtain the designated gain. For this reason, the gain of the EDF 105*rp* is maintained almost constant.

The control circuit 163*rp* designates the gain of the EDF 115*rp* to an AGC 143*rp*. Referring to outputs from PDs 126*rp*, 128*rp*, the AGC 143*rp* controls the amount of a drive current of an LD 127*rp* to obtain the designated gain. For this reason, the gain of the EDF 115*rp* is maintained almost constant.

Therefore, in the optical amplifying apparatus 97, the gains of the EDFs 105*rp*, 115*rp* are maintained almost constant by the AGCs 141*rp*, 143*rp*, and hence a gain as a function of wavelength of the optical amplifying apparatus 97 can be equal to the compensation amount SL. For this reason, the optical SNRs of the respective channels of the WDM optical signal which is outputted from the optical amplifying apparatus 97 to an optical transmission line 62-2 become almost the same.

Further, the control circuit 163*rp* switches the optical SW 166*rp* so that the WDM optical signal from a CPL 162*rp* is made incident on the spectrum analyzer 165*rp*. The control circuit 163*rp* receives a measurement result from the spectrum analyzer 165*rp*. The control circuit 163*rp* transmits information about the spectrum of the WDM optical signal which is obtained from the spectrum analyzer 165*rp*, the channel number with the shortest wavelength, the channel number with the longest wavelength and a multiplex number, together with the maintenance information or the like which is necessary for operating the optical communication system, to the control circuit 163*rp* in a repeater station 69-2 on the next stage, by using the dedicated line.

The signal powers of the respective channels of the WDM optical signal from the optical amplifying apparatus 97 becomes nonuniform due to the transmission loss and the stimulated Raman scattering in the optical transmission line 62-2. Therefore, the WDM optical signal with the inclination is made incident on the repeater station 69-2.

The respective repeater stations 69 operate similarly to the repeater station 69-1 to transmit the WDM optical signal in sequence. On this occasion, the wavelength dependency of the WDM optical signal which occurs in the optical transmission line 62 due to the transmission loss and the stimulated Raman scattering is compensated by the optical amplifying apparatuses 97 in the respective repeater stations. Hence, the optical SNRs of the respective channels of the WDM optical signal which is outputted from the optical amplifying apparatus 97 to the optical transmission line 62 become almost the same.

In the optical receiving station 70 which received the WDM optical signal with the inclination, the control circuit 163*r* decides the channel number with the shortest wavelength and the channel number with the longest wavelength from the signal which is received in the dedicated line.

The control circuit 163*r* uses the wavelengths of the respective channels which are stored in a memory 164*r* and calculates a wavelength interval between the channel with the longest wavelength and the channel with the shortest wavelength by subtracting the wavelength of the channel with the shortest wavelength from the wavelength of the channel with the longest wavelength.

Further, the control circuit 163*r* switches an optical SW 166*r* so that the WDM optical signal from a CPL 161*r* is made incident on a spectrum analyzer 165*r*. The control circuit 163*r* receives a measurement result from the spectrum analyzer 165*r*.

Then, the control circuit 163*r* calculates the wavelength dependency (inclination) of the WDM optical signal according to the measurement result from the spectrum analyzer 165*r* and information about the spectrum of the WDM optical signal being outputted from the optical transmitting station 68, which is obtained by the signal received in the dedicated line. This measurement result corresponds to the compensation amount SL.

The control circuit 163*r* outputs target values to an ALC 142*r* so that the set signal powers of the respective channels are obtained. The ALC 142*r* adjusts attenuation of a VAT 109*r* while referring to an output from a PD 128*r*.

Here, the signal powers of the respective channels as the target values of the ALC 142*r* are set in the memory 164*r* when the optical receiving station is installed in the optical communication system.

Further, the control circuit 163*r* determines the gain sum of an EDF 105*r* and an EDF 115*r* which corresponds to the correction amount SL (inclination), and adjusts the EDF 105*r* and the EDF 115*r* to obtain the gain sum. As to the adjustment, for example, the gain sum is distributed to the EDF 105*r* and the EDF 115*r* at a ratio of 2:1.

Then, the control circuit 163*r* designates the gain of the EDF 105*r* to an AGC 141*r*. Referring to outputs from PDs 122*r*, 124*r*, the AGC 141*r* controls the amount of a drive current of an LD 123*r* to obtain the designated gain. For this reason, the gain of the EDF 105*r* is maintained almost constant.

The control circuit 163*r* designates the gain of the EDF 115*r* to an AGC 143*r*. Referring to outputs from PDs 126*r*, 128*r*, the AGC 143*r* controls the amount of a drive current of an LD 127*r* to obtain the designated gain. For this reason, the gain of the EDF 115*r* is maintained almost constant.

Therefore, in the optical amplifying apparatus 97, the gains of the EDFs 105*r*, 115*r* are maintained almost constant by the AGCs 141*r*, 143*r*, and hence the gain as a function of wavelength of the optical amplifying apparatus 97 can be equal to the compensation amount SL. For this reason, the optical SNRs of the respective channels of the WDM optical signal which is outputted from the optical amplifying apparatus 97 to the DEMUX 77 become almost the same.

Thus, the transmission loss and the stimulated Raman scattering which occur in the optical transmission line 62 are compensated by the compensation amount SL to improve the optical SNRs, repetition intervals can be lengthened. Also, an interval between the optical transmitting station 68 and the optical receiving station 70 can be lengthened.

Incidentally, in the fifth embodiment, the compensation amount SL is respectively calculated by the control circuits 163rp in the repeater stations 69 and the control circuit 163r in the optical receiving station 70, but, as shown in FIG. 11B, the spectrum of the WDM optical signal being outputted from the optical transmitting station 68, the spectrum of the WDM optical signal being made incident on the respective repeater stations 69, the spectrum of the WDM optical signal being outputted from the respective repeater station 69, and the spectrum of the WDM optical signal being made incident on the optical receiving station 70 which are necessary for calculating the compensation amount SL may be collected temporarily to the control circuit 163s in the optical transmitting station 68 from the control circuits 163rp in the respective repeater stations 69 and the control circuit 163r in the optical receiving station 67. Then, information about these spectrums are concentrated on a supervisory control circuit 175 which manages the overall optical communication system, and the compensation amount of the respective repeater stations 69 and the optical receiving station 70 may be calculated in the supervisory control circuit 175 to transmit its result to the respective repeater stations 69 and the optical receiving station 70 through the control circuit 163s in the optical transmitting station 68.

Next, another embodiment will be explained.

Structure of a Sixth Embodiment

The sixth embodiment is an embodiment of an optical communication system according to the present invention.

In the optical communication system, a 32-wave WDM optical signal is generated respectively to a wavelength band of C-band (1530 to 1570 nm) and to a wavelength band of L-band (1570 to 1610 nm) in an optical transmitting station 201, and the optical signal is repeated through multiple stages of repeater stations 203 which include a complex optical amplifying apparatus 211 and is to be received and processed in an optical receiving station 204.

The complex optical amplifying apparatus 211 may compensate loss as a function of wavelength of an optical transmission line in advance when the WDM optical signal is transmitted to the repeater station on the next stage, while it may compensate the loss as a function of wavelength of the optical transmission line through which the WDM optical signal which is transmitted from the repeater station on the preceding stage to be made incident thereon is transmitted. In the sixth embodiment, the case of compensating the loss as a function of wavelength of the optical transmission line in advance when the WDM optical signal is transmitted to the repeater station on the next stage will be first explained, and the case of compensating the loss as a function of wavelength of the optical transmission line through which the WDM optical signal which is transmitted from the repeater station on the preceding stage to be made incident thereon is transmitted will be explained later as its modification.

Figure 13:
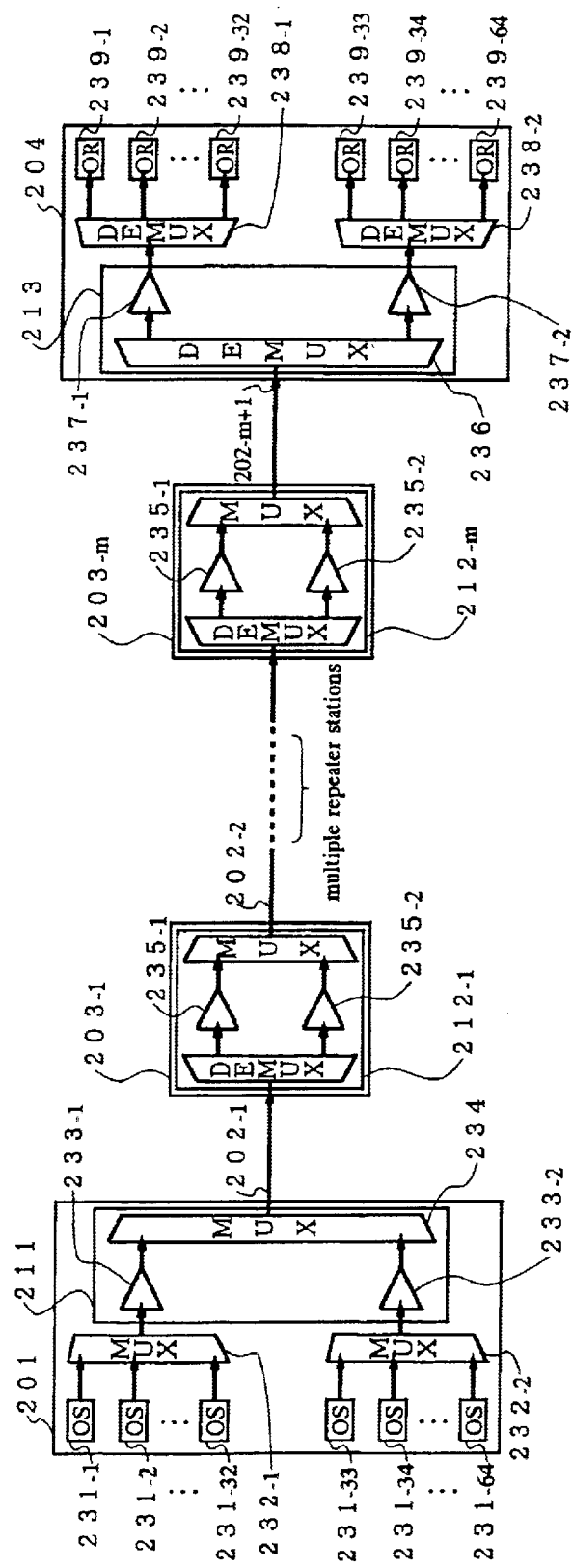
FIG. 13 shows the structure of an optical communication system according to a sixth embodiment.

FIG. 13 is a view showing the structure of the optical communication system according to the sixth embodiment.

Figure 14:
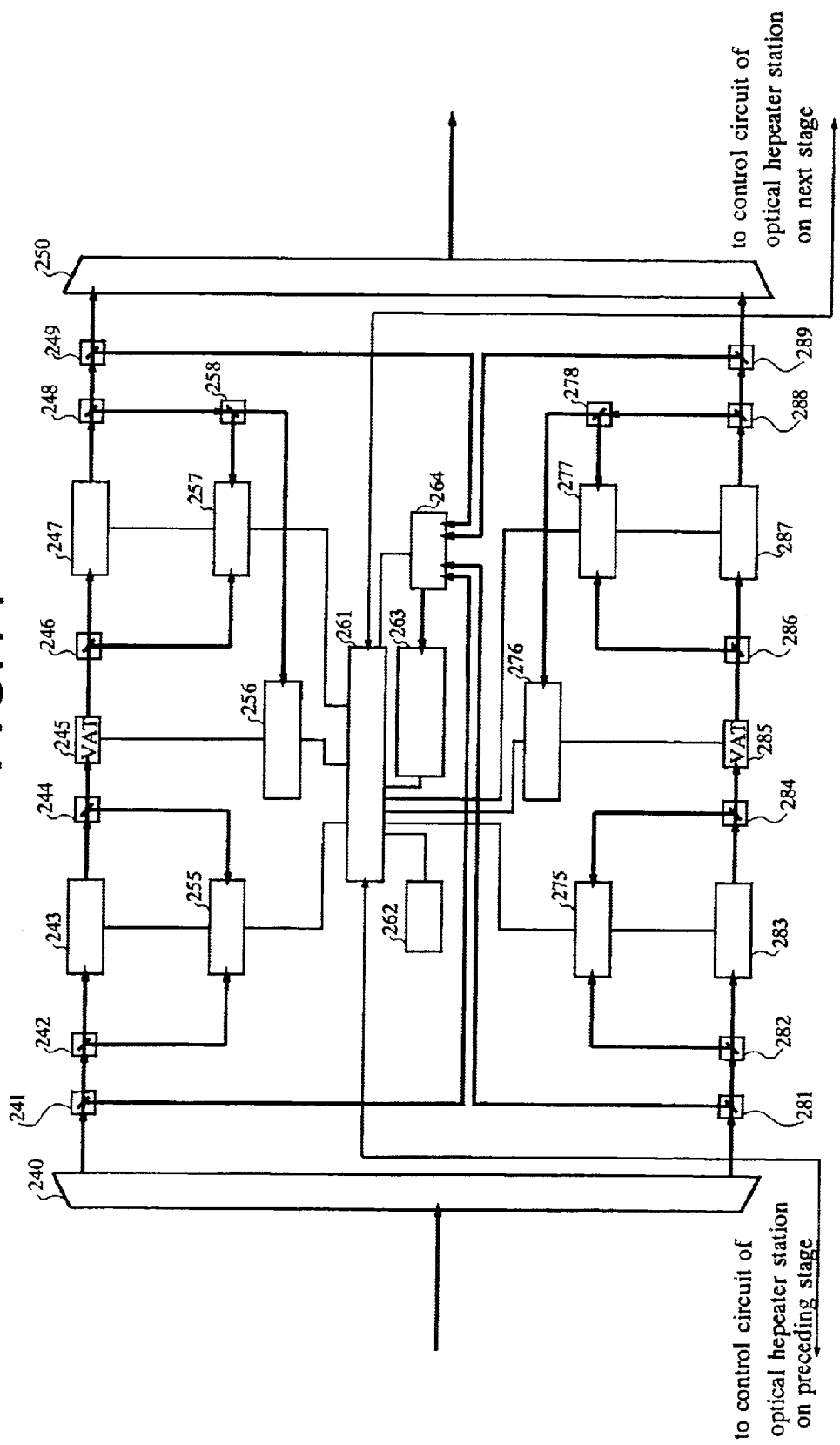
FIG. 14 shows the structure of a complex optical amplifying apparatus in the optical communication system according to the sixth embodiment, and FIG. 15 show tables of a compensation amount SL corresponding to a length of transmission line and a multiplex number (channel number).

FIG. 14 is a view showing the structure of the complex optical amplifying apparatus in the optical communication system according to the sixth embodiment.

In FIG. 13, thirty-two OSs 231-1 to 231-32, out of sixty-four OSs 231-1 to 231-64, respectively generate optical signals to the C-band, which correspond to a channel 1 to a channel 32. The generated optical signals are wavelength-multiplexed in an MUX 232-1 to become a 32-wave WDM optical signal of the C-band. The WDM optical signal of the C-band is made incident on a complex optical amplifying apparatus 211.

Further, thirty-two OSs 231-33 to 231-64, out of the sixty-four OSs 231-1 to 231-64, respectively generate optical signals to the L-band, which correspond to a channel 33 to a channel 64. The generated optical signals are wavelength-multiplexed in an MUX 232-2 to become a 32-wave WDM optical signal of the L-band. The WDM optical signal of the L-band is made incident on the complex optical amplifying apparatus 211.

The WDM optical signal of the C-band and the WDM optical signal of the L-band which are made incident on the complex optical amplifying apparatus 211 are respectively amplified in optical amplifying parts 233-1, 233-2 according to a wavelength characteristic of a compensation amount SL which will be described later to be made incident on an MUX 234.

The WDM optical signal of the C-band and the WDM optical signal of the L-band which are made incident on the MUX 234 are wavelength-multiplexed in the MUX 234 to become the WDM optical signal with two wavelength bands, outputted to an optical transmission line 202-1 and transmitted to a repeater station 203-1 on the next stage.

The WDM optical signal with the two wavelength bands which transmits through the optical transmission line 202-1 is made incident on a complex optical amplifying apparatus 212-1 in the repeater station 203-1.

The WDM optical signal with the two wavelength bands which is made incident on the complex optical amplifying apparatus 212-1 is demultiplexed in a WDM coupler 240 (FIG. 14) as a DEMUX to the WDM optical signal of the C-band and the WDM optical signal of the L-band. The demultiplexed WDM optical signal of the C-band is amplified in an optical amplifying part 235-1 according to the wavelength characteristic of the compensation amount SL which will be described later to be made incident on a WDM coupler 250 (FIG. 14) as the MUX. Further, the demultiplexed WDM optical signal of the L-band is amplified in an optical amplifying part 235-2 according to the wavelength characteristic of the compensation amount SL which will be described later to be made incident on the WDM coupler 250 (FIG. 14) as the MUX.

The WDM optical signal of the C-band and the WDM optical signal of the L-band which are made incident on the WDM coupler 250 are wavelength-multiplexed in the WDM coupler 250 to become the WDM optical signal with the two wavelength bands again, outputted to an optical transmission line 202-2 and transmitted to a repeater station 203-2 on the next stage.

The WDM optical signal with the two wavelength bands is amplified in sequence by the repeater stations 203 to be made incident on the optical receiving station 204.

The WDM optical signal with the two wavelength bands which is made incident on the optical receiving station 204 is made incident on a DEMUX 236 in a complex optical amplifying apparatus 213, whose wavelength is demultiplexed to the WDM optical signal of the C-band and the WDM optical signal of the L-band.

The demultiplexed WDM optical signal of the C-band is amplified in an optical amplifying part 237-1 according to the wavelength characteristic of the compensation amount SL which will be described later to be made incident on a DEMUX 238-1. Then, the wavelength of the WDM optical signal of the C-band is demultiplexed by each of the channels in the DEMUX 238-1, and the channels are made incident on corresponding ORs 239-1 to 239-32, respectively, to be received and processed therein.

The demultiplexed WDM optical signal of the L-band is amplified in an optical amplifying part 237-2 according to the wavelength characteristic of the compensation amount SL which will be described later to be made incident on a DEMUX 238-2. Then, the wavelength of the WDM optical signal of the L-band is demultiplexed by each of the channels in the DEMUX 238-2, and the channels are made incident on corresponding ORs 239-33 to 239-64, respectively, to be received and processed therein.

Next, the complex optical amplifying apparatuses 211, 212, 213 will be explained. First, the complex optical amplifying apparatus 212 will be explained, and only the difference between the complex optical amplifying apparatuses 211, 213 and the complex optical amplifying apparatus 212 will be explained.

In FIG. 14, the WDM optical signal with the two wavelength bands which is made incident on the complex optical amplifying apparatus 212 is made incident on the WDM coupler 240. In the WDM coupler 240, the wavelength of the WDM optical signal with the two wavelength bands is demultiplexed to the WDM optical signal of the C-band and the WDM optical signal of the L-band. The demultiplexed WDM optical signal of the C-band is made incident on a CPL 241.

Light is divided in the CPL 241 and one of these is made incident on an optical SW 264. Further, the other light which is divided in the CPL 241 is made incident on a CPL 242.

Light is divided in the CPL 242 and one of these is made incident on an optical amplifier 243 which can amplify the wavelength of the incident C-band, and the other light is made incident on an AGC part 255 which controls the optical amplifier 243 to hold a predetermined fixed gain.

The light from the optical amplifier 243 is made incident on a CPL 244. The light is divided in the CPL 244 and one of these is made incident on a VAT 245 and the other light is made incident on the AGC part 255.

The AGC part 255 receives the light from the CPL 242 and detects its signal power. The AGC part 255 receives the light from the CPL 244 and detects its signal power. Further, the AGC part 255 decides the gain of the optical amplifier 243 from these detection results, and controls the optical amplifier 243 so that the gain becomes a predetermined gain which is designated by a control circuit 261.

The light which is attenuated in the VAT 245 is made incident on a CPL 246. The light is divided in the CPL 246 and one of these is made incident on an optical amplifier 247 which can amplify the wavelength of the incident L-band, and the other light is made incident on an AGC part 257 which controls the optical amplifier 247 to hold a predetermined fixed gain.

The light from the optical amplifier 247 is made incident on a CPL 248. The light is divided in the CPL 248 and one of these is made incident on a CPL 249 and the other light is made incident on the AGC part 257 and an ALC part 256 through a CPL 258.

Similarly to the AGC part 255, the AGC part 257 receives the light from the CPL 246 and the light from the CPL 248 and detects the respective signal powers. Further, the AGC part 257 decides the gain of the optical amplifier 247 from these detection results, and controls the optical amplifier 247 so that the gain becomes a predetermined gain which is designated by the control circuit 261.

The light is divided in the CPL 249 and one of these is made incident on the WDM coupler 250 and the other light is made incident on the optical SW 264.

The ALC part 256 receives the light which is made incident thereon through the CPL 248 and the CPL 258 and detects its signal power. The ALC part 256 decides output signal power of the WDM optical signal of the C-band from the detection result, and controls attenuation of the VAT 245 so that predetermined output signal power which is designated by the control circuit 261 is obtained.

Thus, the WDM optical signal of the C-band out of the WDM optical signals with the two wavelength bands is amplified.

Similarly, the WDM optical signal of the L-band which is demultiplexed in the WDM coupler 240 is made incident on an optical amplifier 283 through a CPL 281 and a CPL 282 to be amplified therein. The amplified light is made incident on a VAT 285 through a CPL 284 to be attenuated therein. The attenuated light is made incident on an optical amplifier 287 through a CPL 286 to be amplified therein. The amplified light is made incident on the WDM coupler 250 through a CPL 288 and a CPL 289.

Then, the light is divided in the CPL 281 to be made incident on the optical SW 264.

The lights which are divided in the CPL 282 and the CPL 284 are made incident on an AGC part 275, and similarly to the AGC part 255, the AGC part 257 decides a gain of the optical amplifier 283 from signal powers of the lights, and controls the optical amplifier 283 so that the gain becomes a predetermined gain which is designated by the control circuit 261. Further, the lights which are divided in the CPL 286 and the CPL 288 are made incident on an AGC part 277, and similarly to the AGC part 255, the AGC part 277 decides a gain of the optical amplifier 287 from signal powers of the lights, and controls the optical amplifier 287 so that the gain becomes a predetermined gain which is designated by the control circuit 261.

An ALC part 276 decides output signal power of the WDM optical signal of the L-band from the signal power of the light which is made incident thereon through the CPL 288 and a CPL 278, and controls attenuation of the VAT 285 so that predetermined output signal power which is designated by the control circuit 261 is obtained.

Then, the light is divided in the CPL 289 to be made incident on the optical SW 264.

The optical SW 264 selects any one of the light from the CPL 241, the light from the CLP 249, the light from the CPL 281 and the light from the CPL 289 according to the control of the control circuit 261, and allows it to be made incident on a spectrum analyzer 263.

The spectrum analyzer 263 measures a wavelength of the incident light (frequency) and signal power of the light with the wavelength, and outputs its result to the control circuit 261. Information such as maintenance information and status information which is necessary for operating the optical communication system, for example, the spectrums of the WDM optical signals of the C-band and the L-band being made incident on the repeater station 203, which is obtained from the spectrum analyzer 263 is transmitted as a supervisory signal by the control circuit 261 to the control circuit 261 in the optical transmitting station 201 on the preceding stage or the control circuit 261 in the repeater station 203 on the preceding stage. Further, the control circuit 261 receives the supervisory signal which includes the spectrums of the WDM optical signals of the C-band and the L-band being made incident on the optical receiving station 204 on the next stage or the repeater station 203 on the next stage, from the control circuit 261 in the optical receiving station 204 on the next stage or the control circuit 261 in the repeater station 203 on the next stage.

In a memory 262, a relationship between gain sums of the optical amplifiers 243, 247 and inclinations of the gain sums $(dG/d\lambda)$, a relationship between gain sums of the optical amplifiers 283, 287 and inclinations of the gain sums $(dG/$ dλ), output signal power when the WDM optical signal with the two wavelength bands is outputted from the repeater station 203 to the optical transmission line 202 and the like are stored. Further, the memory 262 outputs these stored contents to the control circuit 261, receives the value calculated in the control circuit 261, the output value from the spectrum analyzer 263, the gains of the AGC part 255, 257, 275, 277, the target values of the ALC parts 256, 276 and the like from the control circuit 261, stores these, and outputs the stored contents to the control circuit 261 again.

As the optical amplifiers 243, 247, an erbium-doped optical fiber amplifier which amplifies the wavelength band of the C-band can be used. Further, as the optical amplifiers 283, 287, a gain shift erbium-doped optical fiber amplifier which amplifies the wavelength band of the L-band can be used. Incidentally, the main difference therebetween is a difference in the length of the optical fiber doped with the erbium. Amplification bands of the erbium-doped optical fiber are basically 1550 nm wavelength band and 1580 nm wavelength band. Since an amplification factor of the 1580 nm wavelength band is smaller than that of the 1550 nm wavelength band, the length of the optical fiber needs to be lengthened by approximately 10 times in the case of the 1580 nm wavelength band compared with the optical fiber amplifier of the 1550 nm wavelength band, in order to realize the optical amplification of the same level.

The structure of the complex optical amplifying apparatus 211 in the optical transmitting station 201 is the structure of the aforesaid complex optical amplifying apparatus 212 without the WDM coupler 240 which demultiplexes the wavelength of the WDM optical signal with the two wavelength bands to the respective band, because the WDM optical signal of the C-band and the WDM optical signal of the L-band are generated separately.

Moreover, the structure of the complex optical amplifying apparatus 213 in the optical receiving station 204 is the structure of the aforesaid complex optical amplifying apparatus 212 without the WDM coupler 250 which wavelength-multiplexes the WDM optical signal with the C-band and the WDM optical signal with the L-band, because the amplified WDM optical signal with the C-band and the WDM optical signal with the L-band are received and processed separately.

Operation and Effects of the Sixth Embodiment

Next, the operation and effects of the optical communication system according to the sixth embodiment will be explained.

The WDM optical signal of the C-band which is generated in the optical transmitting station 201 is made incident on an optical amplifying part 233-1, and the WDM optical signal of the L-band which is generated therein is made incident on an optical amplifying part 233-2.

In the optical amplifying part 233-1, the control circuit 261s outputs target values to an ALC part 256s so that the signal powers of the respective channels which are stored in a memory 262s are obtained. The ALC part 256s adjusts attenuation of a VAT 245s while referring to signal powers of the lights which are made incident thereon through a CPLs 248s, 258s.

Further, the control circuit 261s determines the gain sum of an optical amplifier 243s and an optical amplifier 247s so that an almost flattened inclination is obtained, and distributes the gain sum to the optical amplifier 243s and the optical amplifier 247s.

Furthermore, the control circuit 261s designates the gains to an AGC part 255s and an AGC part 257s, respectively. Referring to signal powers of the lights which are made incident thereon from a CLP 242s and a CPL 244s, the AGC part 255s controls the gain of the optical amplifier 243s to the designated gain. For this reason, the gain of the optical amplifier 243s is maintained almost constant. Referring to signal powers of the lights which are made incident thereon from a CLP 246s and the CPL 248s, the AGC part 257s controls the gain of the optical amplifier 247s to the designated gain. For this reason, the gain of the optical amplifier 247s is maintained almost constant.

Being thus controlled, the WDM optical signal of the C-band becomes the WDM optical signal whose channels have almost the same signal powers, to be outputted to a WDM coupler 250s.

Similarly, the WDM optical signal of the L-band also becomes the WDM optical signal whose channels have almost the same signal powers by the control circuit 261s, an AGC parts 275s, 277s, and an ALC part 15 276s in the optical amplifying part 233-2 to be outputted to the WDM coupler 250s.

Incidentally, in the WDM coupler 250, when there is a difference between loss to the WDM optical signal of the C-band and loss to the WDM optical signal of the L-band, the control circuit 261s designates the target values respectively to the ALC parts 256s, 276s, in consideration of the difference.

The control circuit 261s switches an optical SW 264s so that the WDM optical signal from the CPL 249s is made incident on a spectrum analyzer 263s. The control circuit 261s receives a measurement result from the spectrum analyzer 263s. Further, the control circuit 261s switches the optical SW 264s so that the WDM optical signal from a CPL 289s is made incident on a spectrum analyzer 263s and receives a measurement result from the spectrum analyzer 263s.

Then, the control circuit 261s transmits information about the spectrums of the WDM optical signals of the C-band and the L-band, which is obtained from the spectrum analyzer 263s, a channel number with the shortest wavelength, a channel number with the longest wavelength and a multiplex number, together with maintenance information and the like which are necessary for operating the optical communication system, to a control circuit 261rp in the repeater station 203 on the next stage by using a dedicated line.

Being thus controlled, the WDM optical signal with the two wavelength bands which is outputted from the optical transmitting station 201 becomes the WDM optical signal whose channels have almost the same signal powers to be outputted to the optical transmission line 202-1.

The signal powers of the respective channels of the WDM optical signal with the two wavelength bands become non-uniform due to transmission loss and a stimulated Raman scattering in the optical transmission line 202-1. Therefore, the WDM optical signal with the two wavelength bands with an inclination is made incident on the repeater station 203-1. The wavelength of the incident WDM optical signal with the two wavelength bands is demultiplexed in the WDM coupler 240 to the respective band.

In the repeater station 203-1 which received the WDM optical signal with the two wavelength bands with the inclination, the control circuit 261rp decides the channel number with the shortest wavelength and the channel number with the longest wavelength from the signal which is received in the dedicated line.

The control circuit 261rp uses the wavelengths of the respective channels which are stored in a memory 261rp and calculates a wavelength interval between the channel with the longest wavelength and the channel with the shortest wavelength by subtracting the wavelength of the channel with the shortest wavelength from the wavelength of the channel with the longest wavelength.

The control circuit 261*rp* switches an optical SW 264*rp* so that the WDM optical signal of the C-band from a CPL 241*rp* is made incident on a spectrum analyzer 263*rp*. The control circuit 261*rp* receives a measurement result from the spectrum analyzer 263*rp*. Further, the control circuit 261*rp* switches the optical SW 264*rp* so that the WDM optical signal of the L-band from a CPL 281*rp* is made incident on the spectrum analyzer 263*rp*, and receives the measurement result from the spectrum analyzer 263*rp*.

The control circuit 261*rp* calculates wavelength dependency (inclination) of the WDM optical signal with the two wavelength bands from the measurement result from the spectrum analyzer 263*rp* and information about the spectrum of the WDM optical signal with the two wavelength bands being outputted from the optical transmitting station 201, which is obtained by the signal which is received in the dedicated line. This measurement result corresponds to the compensation amount SL.

The control circuit 261*rp* may determine the length of the optical transmission line 202-1 from these spectrums, and calculate the correction amount SL with using (formula 1) to (formula 4) and (formula 10) from these spectrums.

The control circuit 261*rp* outputs target values to ALCs 256*rp* and 276*rp* so that the set signal powers of the respective channels are obtained. The ALC part 256*rp* adjusts attenuation of a VAT 245*rp* while referring to signal power of the light which is made incident thereon through CPLs 248*rp*, 258*rp*. The ALC part 276*rp* adjusts attenuation of a VAT 285*rp* while referring to signal power of the light which is made incident thereon through CPLs 288*rp*, 278*rp*.

Here, the signal powers of the respective channels which are the target values of the ALC parts 256*rp*, 276*rp* are set in the memory 262*rp* when the repeater station 203-1 is installed in the optical communication system. Especially, the signal powers of the respective channels are set to such values that a nonlinear optical effect is not caused in the optical transmission line 202 and these can be transmitted properly to the repeater station 203 on the next stage.

Further, the control circuit 261*rp* determines the gain sum of an optical amplifier 243*rp* and an optical amplifier 247*rp* which corresponds to the correction amount SL (inclination), and adjusts the optical amplifier 243*rp* and the optical amplifier 247*rp* to obtain the gain sum. As to the adjustment, for example, the gain sum is distributed to the optical amplifier 243*rp* and the optical amplifier 247*rp* at a ratio of 2:1.

Furthermore, the control circuit 261*rp* sets a combination of the respective gains of the optical amplifier 243*rp* and the optical amplifier 247*rp* with which the gain sum can be maintained constant and the inclination of the correction amount SL is obtained, from a relationship of the gain G and the inclination which is stored in the memory 262*rp*.

The control circuit 261*rp* designates the gain of the optical amplifier 243*rp* to an AGC part 255*rp*. Referring to signal powers of the lights which are made incident thereon from a CLP 242*rp* and a CPL 244*rp*, the AGC part 255*rp* controls the gain of the optical amplifier 243*rp* to the designated gain. For this reason, the gain of the optical amplifier 243*rp* is maintained almost constant. Referring to signal powers of the lights which are made incident thereon from a CLP 246*rp* and the CPL 248*rp*, an AGC part 275*rp* controls the gain of the optical amplifier 247*rp* to the designated gain. For this reason, the gain of the optical amplifier 247*rp* is maintained almost constant.

Therefore, in the complex optical amplifying apparatus 212-1, the gains of the optical amplifiers 243*rp*, 247*rp* can be maintained almost constant by the AGC parts 255*rp*, 257*rp*, and hence a gain as a function of wavelength of the WDM optical signal of the C-band can be equal to the compensation amount SL.

Similarly, as to the WDM optical signal of the L-band, a gain as a function of wavelength of the WDM optical signal of the L-band can be equal to the compensation amount SL due to the control circuit 261*s*, AGC parts 275*rp*, 277*rp* and the ALC part 276*rp*, in the optical amplifying part 235-2.

For this reason, the optical SNRs of the respective channels of the WDM optical signal with the two wavelength bands which is outputted from the complex optical amplifying apparatus 212-1 (repeater station 203-1) to the optical transmission line 202-2 become almost the same.

Moreover, the control circuit 261*rp* switches the optical SW 264*rp* so that the WDM optical signal of the C-band from a CPL 249*rp* is made incident on the spectrum analyzer 263*rp*, and receives the measurement result from the spectrum analyzer 263*rp*. Further, the control circuit 261*rp* switches the optical SW 264*rp* so that the WDM optical signal of the L-band from a CPL 289*rp* is made incident on the spectrum analyzer 263*rp*, and receives the measurement result from the spectrum analyzer 263*rp*.

Then, the control circuit 261*rp* transmits information about the spectrums of the WDM optical signals of the respective bands, which is obtained from the spectrum analyzer 263*rp*, the channel number with the shortest wavelength, the channel number with the longest wavelength and the multiplex number, together with the maintenance information and the like which are necessary for operating the optical communication system, to the control circuit 261*rp* in the repeater station 203-2 on the next stage by using the dedicated line.

The signal powers of the respective channels of the WDM optical signal with the two wavelength bands from the repeater station 203-1 become nonuniform due to the transmission loss and the stimulated Raman scattering in the optical transmission line 202-2. Therefore, the WDM optical signal with the two wavelength bands with the inclination is made incident on the repeater station 203-2.

The respective repeater stations 203 operate similarly to the repeater station 203-1 to transmit the WDM optical signal with the two wavelength bands in sequence. On this occasion, the wavelength dependency of the WDM optical signal with the two wavelength bands which occurs in the optical transmission line 202 due to the transmission loss and the stimulated Raman scattering is compensated by the complex optical amplifying apparatus 212 in the respective repeater stations.

Hence, the optical SNRs of the respective channels of the WDM optical signal with the two wavelength bands which is outputted from the repeater station 203 to the optical transmission line 202 become almost the same.

In the optical receiving station 204 which received the WDM optical signal with the two wavelength bands with the inclination, a control circuit 261*r* decides the channel number with the shortest wavelength and the channel number with the longest wavelength from the signal which is received in the dedicated line.

The control circuit 261*r* uses the wavelengths of the respective channels which are stored in a memory 262*r* and calculates a wavelength interval between the channel with the longest wavelength and the channel with the shortest wavelength by subtracting the wavelength of the channel with the shortest wavelength from the wavelength of the channel with the longest wavelength.

Moreover, the control circuit 261r switches an optical SW 264r so that the WDM optical signal of the C-band from a CPL 241r is made incident on a spectrum analyzer 263r, and receives a measurement result from the spectrum analyzer 263r. Further, the control circuit 261r switches the optical SW 264r so that the WDM optical signal of the L-band from a CPL 281r is made incident on the spectrum analyzer 263r, and receives the measurement result from the spectrum analyzer 263r.

The control circuit 261rp calculates the wavelength dependency (inclination) of the WDM optical signal with the two wavelength bands from the measurement result from the spectrum analyzer 263r and information about the spectrum of the WDM optical signal with the two wavelength bands being outputted from a repeater station 203-m on the preceding stage, which is obtained by the signal received in the dedicated line. This measurement result corresponds to the compensation amount SL.

The control circuit 261r outputs target values to ALCs 256r and 276r so that the set signal powers of the respective channels are obtained. The ALC part 256r adjusts attenuation of a VAT 245r while referring to signal power of the light which is made incident thereon through CPLs 248r, 258r. The ALC part 276r adjusts attenuation of a VAT 285r while referring to signal power of the light which is made incident thereon through CPLs 288r, 278r.

Here, the signal powers of the respective channels which are the target values of the ALC parts 256r, 276r are set in the memory 262r when the optical receiving station is installed in the optical communication system. Especially, the signal powers of the respective channels are set to such values that the optimal signal powers are made incident on the ORs 239-1 to 239-64, in consideration of the losses of the DEMUXs 238-1, 238-2.

Further, the control circuit 261rp determines the gain sum of an optical amplifier 243r and an optical amplifier 247r which corresponds to the correction amount SL (inclination), and adjusts the optical amplifier 243r and the optical amplifier 247r to obtain the gain sum. As to the adjustment, for example, the gain sum is distributed to the optical amplifier 243r and the optical amplifier 247r at a ratio of 2:1.

The control circuit 261r designates the gain of the optical amplifier 243r to an AGC part 255r. Referring to signal powers of the lights which are made incident thereon from a CLP 242r and a CPL 244r, the AGC part 255r controls the gain of the optical amplifier 243r to the designated gain. For this reason, the gain of the optical amplifier 243r is maintained almost constant. Referring to signal powers of the lights which are made incident thereon from a CLP 246r and the CPL 248r, the AGC part 257r controls the gain of the optical amplifier 247r to the designated gain. For this reason, the gain of the optical amplifier 247r is maintained almost constant.

Therefore, in the complex optical amplifying apparatus 212-1, the gains of the optical amplifiers 243r, 247r can be maintained almost constant by the AGC parts 255r, 257r, and hence the gain as a function of wavelength of the WDM optical signal of the C-band can be equal to the compensation amount SL.

Similarly, the gain as a function of wavelength of the WDM optical signal of the L-band can be equal to the compensation amount SL due to the control circuit 261s, AGC parts 275r, 277r and the ALC part 15 276r, in the optical amplifying part 235-2.

For this reason, the optical SNRs of the respective channels of the respective bands which are outputted from the complex optical amplifying apparatus 213 to the DEMUXs 238-1, 238-2 become almost the same.

Thus, the transmission loss and the stimulated Raman scattering which occur in the optical transmission line 202 are compensated by the compensation amount SL to improve the optical SNRs, and hence repetition intervals can be lengthened. Also, an interval between the optical transmitting station 201 and the optical receiving station 204 can be lengthened.

Incidentally, in the sixth embodiment, the spectrum of the WDM optical signal with the two wavelength bands which is outputted from the repeater station 203 on the preceding stage (optical transmitting station 201) is received, and the loss as a function of wavelength of the WDM optical signal with the two wavelength bands which occurs in the optical transmission line 202 is compensated in the respective repeater stations 203 and the optical receiving station 204, but it may be compensated in advance in the respective repeater stations 203 and the optical transmitting station 201 and thereafter, the WDM optical signal with the two wavelength bands may be outputted to the optical transmission line 202. In this case, the spectrum of the WDM optical signal with the two wavelength bands which is made incident on the repeater station 203 on the subsequent stage (optical receiving station 204) is allowed to be received in the repeater station 203 (optical transmitting station 201) in which it is compensated in advance.

This structure is the modification of the sixth embodiment.

Incidentally, in the sixth embodiment, the compensation amount SL is calculated respectively by the control circuits 261rp in the respective repeater stations 203 and the control circuit 261r in the optical receiving station 204, but, information about the spectrums which is necessary for calculating the compensation amount SL may be collected temporarily to the control circuit 261s in the optical transmitting station 201 from the control circuits 261rp in the respective repeater stations 203 and the control circuit 261r in the optical receiving station 204. Then, information about these spectrums is concentrated on a supervisory control circuit which manages the overall optical communication system, and the compensation amount of the respective repeater stations 203 and the optical receiving station 204 may be calculated in the supervisory control circuit to transmit its result to the respective repeater stations 203 and the optical receiving station 204 through the control circuit 261s in the optical transmitting station 201.

Incidentally, in the third embodiment to the sixth embodiment, the compensation amount SL is calculated in the control circuits 145, 151, 163, 261 and the supervisory control circuits 170, 175 in the respective embodiments, however, the compensation amount SL may be calculated in advance according to the transmission distance and the multiplex number in order to prepare a table of the calculation results. Examples are shown in FIG. 15.

FIG. 15 are views showing the tables of the compensation amount SL corresponding to the length and the multiplex number (channel number).

FIG. 15A is a table of the compensation amount SL which can be used for the third embodiment to the fifth embodiment, and FIG. 15B is a table of the compensation amount SL which can be used for the sixth embodiment. It should be mentioned that, in preparing FIG. 15, signal powers of the respective channels are predetermined fixed values in spite of the multiplex number and the length because these are the values which are set in designing the optical communication system.

As shown in FIG. 15A, in the table of the compensation amount SL which is used for the third embodiment to the fifth embodiment, the multiplex number is divided by the multiplex numbers in a fixed range, and the transmission distance is also divided by the transmission distance in a fixed range. Further, in this table of the compensation amount SL, the compensation amounts SL are respectively set to all combinations of the divided multiplex number in the fixed range and the divided transmission distance in the fixed range.

Moreover, as shown in FIG. 15B, in the table of the compensation amount SL which is used for the sixth embodiment, the multiplex number is divided by the multiplex numbers in a fixed range, and the transmission distance is also divided by the transmission distance in a fixed range, in the C-band and the L-band, respectively. Further, in this table of the compensation amount SL, the compensation amounts SL are respectively set to all combinations of the divided multiplex number in the fixed range and the divided transmission distance in the fixed range of the C-band, and the divided multiplex number in the fixed range and the divided transmission distance in the fixed range of the L-band.

This kind of table of the compensation amount SL may be stored in the memories 146, 152, 164, 262, and it is suitable to allow the control circuits 145, 151, 163, 261 and the supervisory control circuits 170, 175 to refer to the table of the compensation SL, instead of calculating the compensation amount SL, to search the compensation amount SL corresponding to the multiplex number and the transmission distance. Using the table of the compensation amount SL eliminates the necessity of the calculation, and hence it is possible to lighten the load of the control circuits 145, 151, 163, 261 and the supervisory control circuits 170,175 and promptly control the optical amplifying apparatuses 90, 91, 92, 94, 97 and the complex optical amplifying apparatuses 211, 212, 213.

Moreover, the case of multiplexing 32 waves into the WDM optical signal and the case of multiplexing 64 waves has been explained in the third embodiment to the fifth embodiment and in the sixth embodiment, respectively, but it is not restrictive. The multiplex number (channel number) of the WDM optical signal can be arbitrary.

Furthermore, in the third embodiment to the sixth embodiment, explanations have been given of the case in which the multiplex number of the WDM optical signal does not change between the optical transmitting stations 61, 65, 68, 201 and the optical receiving stations 64, 67, 70, 204, but the optical amplifying apparatus according to the present invention can be used in an optical communication system which includes optical acid/drop multiplexers which adds/drops the channel to/from the WDM optical signal between two stations, because the (formula 1) to the (formula 10) holds therefor. Also, the optical amplifying apparatus according to the present invention can be used in a ring network because of the above reason.

Moreover, in the sixth embodiment, explanation has been given about the WDM optical signal with the two wavelength bands in which the WDM optical signal of the C-band and the WDM optical signal of the L-band are wavelength-multiplexed, but it is not restrictive. It can be used for a WDM optical signal with n wavelength bands in which the WDM optical signals in a plurality or any number of wavelength bands is wavelength-multiplexed. For example, the C-band and S$^+$-band (1450 nm to 1490 nm) may be wavelength-multiplexed. In this case, a thulium-doped fiber amplifier can be used for an optical amplifier which amplifies the wavelength band of the S$^+$-band.

Further, in the third embodiment to the sixth embodiment, when the repeater station has an ADM (add/drop multiplexer) function for adding/dropping a predetermined optical signal to/from the WDM optical signal, the change of the channel number is taken into consideration in the calculation of the compensation amount (SL). Information about the channel number may be transmitted to the respective stations by using, for example, the OSC and the like.

The invention is not limited to the above embodiments and various modifications may be made without departing from the spirit and the scope of the invention. Any improvement may be made in part or all of the components.

What is claims is:

1. An optical amplifying apparatus, comprising a gain wavelength characteristic to amplify an input wavelength-multiplexed light to substantially preemptively compensate for a loss wavelength characteristic of an optical transmission line, through which the amplified light thereafter propagates, by outputting the amplified light to the transmission line with a tilted wavelength gain such that a resultant optical signal at a point downstream from the optical amplifying apparatus will have a flat wavelength gain.

2. An optical amplifying apparatus, comprising:
   a first optical amplifying unit to amplify input wavelength-multiplexed light;
   an optical attenuating unit to attenuate the amplified light;
   a second optical unit to amplify the attenuated light, with the amplified attenuated light thereafter being propagated through an optical transmission line; and
   a control unit to adjust an amount of attenuation performed by the optical attenuating unit, wherein
   the amount of attenuation is set to an amount such that a gain wavelength characteristic of the optical amplifying apparatus substantially compensates for a loss wavelength characteristic of the optical transmission line by outputting the amplified light to the transmiss line with a tilted wavelength gain such that a resultant optical signal at a point downstream from the optical amplifying apparatus will have a flat wavelength gain.

3. The optical amplifying apparatus according to claim 1, wherein
   the loss wavelength characteristic is defined as a difference in spectrum between input light and output light to/from the optical transmission line.

4. The optical amplifying apparatus according to claim 2, wherein
   the loss wavelength characteristic is defined as a difference in spectrum between input light and output light to/from said optical transmission line.

5. The optical amplifying apparatus according to claim 1, wherein the loss wavelength characteristic is due to a transmission loss and a stimulated Raman scattering in the optical transmission line, and determined according to a length of the optical transmission line.

6. The optical amplifying apparatus according to claim 5, wherein the length is calculated from a difference in mean signal power between input light and output light to/from the optical transmission line.

7. The optical amplifying apparatus according to claim 5, wherein
   the light is a wavelength-division multiplexed optical signal obtained by wavelength-multiplexing a plurality of optical signals; and
   the loss wavelength characteristic is determined according to a number of times the optical signals are multiplexed in the wavelength-division multiplexed optical signal and according to a power of light input to the optical transmission line.

8. The optical amplifying apparatus according to claim 2, wherein the loss wavelength characteristic is due to a transmission loss and a stimulated Raman scattering in the optical transmission line, and determined according to a length of the optical transmission line.

9. The optical amplifying apparatus according to claim 8, wherein the length of the optical transmission line is calculated based on a difference in mean signal power between input light and output light to/from the optical transmission line.

10. The optical amplifying apparatus according to claim 8, wherein:
  the light is a wavelength-division multiplexed optical signal obtained by wavelength-multiplexing a plurality of optical signals; and
  the loss wavelength characteristic is determined according to a number of times the plurality of optical signals are multiplexed in the wavelength-division multiplexed optical signal and according to a power of light input to the optical transmission line.

11. An optical communication system, comprising:
  an optical transmitting apparatus to generate a wavelength-division multiplexed optical signal by wavelength-multiplexing a plurality of optical signals;
  an optical receiving apparatus to receive and process the wavelength-division multiplexed optical signal;
  an optical transmission line to transmit the wavelength-division multiplexed optical signal between the optical transmitting apparatus and the optical receiving apparatus; and
  an optical repeating apparatus provided in the optical transmission line, to amplify the wavelength-division multiplexed optical signal, wherein
  the optical transmitting apparatus, the optical repeating apparatus, and the optical receiving apparatus are provided with an optical amplifying apparatus having a gain wavelength characteristic which substantially pre-emptively compensates for a loss wavelength characteristic of the optical transmission line by outputting amplified light to the transmission line with a tilted wavelength gain such that a resultant optical signal at a point downstream from the respective optical amplifying apparatus will have a flat wavelength gain.

12. An optical communication system, comprising:
  an optical transmitting apparatus to generate a wavelength-division multiplexed optical signal by wavelength-multiplexing a plurality of optical signals;
  an optical receiving apparatus to receive and process the wavelength-division multiplexed optical signal;
  an optical transmission line to transmit the wavelength-division multiplexed optical signal between the optical transmitting apparatus and the optical receiving apparatus; and
  an optical repeating apparatus provided on the optical transmission line, to amplify the wavelength-division multiplexed optical signal, wherein
  the optical transmitting apparatus, the optical repeating apparatus, and the optical receiving apparatus each include an optical amplifying apparatus having:
    a first optical amplifying unit to amplify input wavelength-division multiplexed light;
    an optical attenuating unit to attenuate the amplified light;
    a second optical amplifying unit to amplify the attenuated light; and
    a control unit to adjust an amount of attenuation performed by the optical attenuating unit, wherein
    the amount of attenuation is set to an amount such that a gain wavelength characteristic of the optical amplifying apparatus substantially compensates, in advance, for a loss wavelength characteristic of the optical transmission line by outputting amplified light to the transmission line with a tilted wavelength gain such that a resultant optical signal at a point downstream from the respective optical amplifying apparatus will have flat wavelength gain.

13. An optical amplifying apparatus to wavelength-multiplex outputs of a plurality of optical amplifying parts and to output the wavelength-multiplexed output to an optical transmission line, wherein
  each of the plurality of optical amplifying parts amplify wavelength-multiplexed light, in wavelength bands different from each other, and respectively amplify light with a gain wavelength characteristic which substantially compensates for a loss wavelength characteristic of the optical transmission line, subsequent to each of the respective optical amplifying parts, by outputting amplified light from respective optical amplifying parts with tilted wavelength gains such that a resultant optical signal at a point downstream from the optical amplifying apparatus will have a flat wavelength gain.

14. An optical amplifying apparatus to demultiplex wavelength-multiplexed light from an optical transmission line into a plurality of lights, each with a plurality of wavelength bands different from each other, and to amplify the demultiplexed lights by a plurality of optical amplifying parts, respectively, for transmission on the optical transmission line, wherein
  each of the plurality of optical amplifying parts amplify respective demultiplexed lights in units of wavelength bands by amplifying a corresponding band, and respectively amplify the respective demultiplexed lights with a gain wavelength characteristic which substantially compensates for a loss wavelength characteristic of the optical transmission line, subsequent to each of the respective optical amplifying parts, by outputting amplified light from respective optical amplifying parts with tilted wavelength gains such that a resultant optical signal at a point downstream from the optical amplifying apparatus will have a flat wavelength gain.

15. The optical amplifying apparatus according to claim 13, each of the plurality of optical amplifying parts further comprise:
  a first optical amplifying unit to amplify light;
  an optical attenuating unit to attenuate the light amplified by the first optical amplifying unit;
  a second optical amplifying unit to amplify the attenuated light attenuated; and
  a control unit to adjust an amount of attenuation performed by the optical attenuating unit so that a gain wavelength characteristic of each of the plurality of optical amplifying parts substantially compensates for a loss wavelength characteristic of the optical transmission line.

16. The optical amplifying apparatus according to claim 14, each of the plurality of optical amplifying parts further comprise:
  a first optical amplifying unit to amplify light;
  an optical attenuating unit to attenuate the light amplified by the first optical amplifying unit;

a second optical amplifying unit to amplify the attenuated light; and a control unit to adjust an amount of attenuation performed by the optical attenuating unit so that a gain wavelength characteristic of each of the plurality of optical amplifying parts substantially compensates for a loss wavelength characteristic of the optical transmission line.

17. The optical amplifying apparatus according to claim 13, wherein the loss wavelength characteristic is due to a transmission loss and a stimulated Raman scattering in the optical transmission line, and determined according to spectrums of lights to be input/output to/from the optical transmission line.

18. The optical amplifying apparatus according to claim 14, wherein the loss wavelength characteristic is due to a transmission loss and a stimulated Raman scattering in the optical transmission line, and determined according to spectrums of lights to be input/output to/from the optical transmission line.

19. An optical communication system, comprising:

an optical transmitting apparatus to generate a wavelength-division multiplexed optical signal by wavelength-multiplexing a plurality of optical signals;

an optical receiving apparatus to receive and process the wavelength-division multiplexed optical signal;

an optical transmission line to transmit the wavelength-division multiplexed optical signal between the optical transmitting apparatus and the optical receiving apparatus; and an optical repeating apparatus provided on the optical transmission line, to amplify the wavelength-division multiplexed optical signal, wherein the optical transmitting apparatus, the optical repeating apparatus, and the optical receiving apparatus each have an optical amplifying apparatus to wavelength-multiplex outputs of a plurality of optical amplifying parts and to output the wavelength-multiplexed outputs to an optical transmission line, and each of the plurality of optical amplifying parts amplifying light with a gain wavelength characteristic which substantially compensates for a loss wavelength characteristic of the optical transmission line, subsequent to each of the respective optical amplifying parts, by outputting amplified light with a tilted wavelength gain such that a resultant optical signal at a point downstream from each of the optical amplifying apparatuses will have a flat wavelength gain.

20. An optical communication system, comprising:

an optical transmitting apparatus to generate a wavelength-division multiplexed optical signal by wavelength multiplexing a plurality of optical signals;

an optical receiving apparatus to receive and process the wavelength-division multiplexed optical signal;

an optical transmission line to transmit the wavelength-division multiplexed optical signal between the optical transmitting apparatus and the optical receiving apparatus; and an optical repeating apparatus provided on the optical transmission line, to amplify the wavelength-division multiplexed optical signal, wherein the optical transmitting apparatus, the optical repeating apparatus, and the optical receiving apparatus each have an optical amplifying apparatus to demultiplex light from an optical transmission line into lights, with a plurality of wavelength bands different from each other, and to amplify the demultiplexed lights by a plurality of optical amplifying parts, respectively, in which each of the plurality of optical amplifying parts:

amplifies the demultiplexed lights in units of wavelength bands by having each of the optical amplifying parts amplifying a corresponding band; and respectively amplifies light with a gain wavelength characteristic which substantially compensates for a loss wavelength characteristic of the optical transmission line, subsequent to each of the respective optical amplifying parts, by outputting amplified light with a tilted wavelength gain such that a resultant optical signal at a point downstream from each of the optical amplifying apparatuses will have a flat wavelength pain.

21. An optical communication system, comprising:

an optical transmitting apparatus to generate a wavelength-division multiplexed optical signal by wavelength-multiplexing a plurality of optical signals;

an optical receiving apparatus to receive and process the wavelength-division multiplexed optical signal;

an optical transmission line to transmit the wavelength-division multiplexed optical signal between the optical transmitting apparatus and the optical receiving apparatus; and an optical repeating apparatus provided in the optical transmission line, to amplify the wavelength-division multiplexed optical signal, wherein the optical transmitting apparatus and/or the optical repeating apparatus and/or the optical receiving apparatus are provided with an optical amplifying apparatus having a gain wavelength characteristic which substantially preemptively compensates for a loss wavelength characteristic of the optical transmission line by outputting amplified light to the transmission line with a tilted wavelength gain such that a resultant optical signal at a point downstream from the respective optical amplifying apparatus will have a flat wavelength gain.

* * * * *

UNITED STATES PATENT AND TRADEMARK OFFICE
CERTIFICATE OF CORRECTION

PATENT NO. : 6,839,162 B2
DATED : January 4, 2005
INVENTOR(S) : Sekiya et al.

It is certified that error appears in the above-identified patent and that said Letters Patent is hereby corrected as shown below:

<u>Title page,</u>
Item [56], References Cited, FOREIGN PATENT DOCUMENTS, change "JP 9-6326519" to -- JP 9-326519 --.

<u>Column 44,</u>
Line 13, change "claims" to -- claimed --.
Line 37, change "tranmiss" to -- transmission --.

<u>Column 46,</u>
Line 16, change "output" to -- outputs --.
Line 55, change "light attenuated;" to -- light; --.

Signed and Sealed this

Twelfth Day of July, 2005

JON W. DUDAS
*Director of the United States Patent and Trademark Office*